(12) United States Patent
Saegusa

(10) Patent No.: US 10,745,553 B2
(45) Date of Patent: Aug. 18, 2020

(54) THERMOPLASTIC RESIN COMPOSITION AND MOLDED ARTICLE THEREOF

(71) Applicant: Kaneka Corporation, Osaka (JP)

(72) Inventor: Kazunori Saegusa, Osaka (JP)

(73) Assignee: KANEKA CORPORATION, Osaka (JP)

( * ) Notice: Subject to any disclaimer, the term of this patent is extended or adjusted under 35 U.S.C. 154(b) by 24 days.

(21) Appl. No.: 15/432,188

(22) Filed: Feb. 14, 2017

(65) Prior Publication Data

US 2017/0190909 A1 Jul. 6, 2017

Related U.S. Application Data

(63) Continuation of application No. PCT/JP2015/072430, filed on Aug. 6, 2015.

(30) Foreign Application Priority Data

Aug. 14, 2014 (JP) ................................. 2014-165226
Mar. 27, 2015 (JP) ................................. 2015-066490

(51) Int. Cl.
*B32B 27/32* (2006.01)
*C08L 69/00* (2006.01)
(Continued)

(52) U.S. Cl.
CPC .............. *C08L 69/00* (2013.01); *B05D 1/007* (2013.01); *B05D 3/0254* (2013.01); *B05D 7/02* (2013.01);
(Continued)

(58) Field of Classification Search
CPC ....... C08L 69/00; C08L 69/005; C08G 64/04; C08G 64/06
See application file for complete search history.

(56) References Cited

U.S. PATENT DOCUMENTS

| | | | | |
|---|---|---|---|---|
| 2004/0152806 A1* | 8/2004 | Koga | ..................... | C08K 5/103 524/115 |
| 2008/0176048 A1* | 7/2008 | Onizawa | ............. | B29C 45/0001 428/195.1 |
| 2009/0275678 A1* | 11/2009 | Kumazawa | ............. | C08L 67/00 523/523 |

FOREIGN PATENT DOCUMENTS

| | | |
|---|---|---|
| JP | S55129444 A | 10/1980 |
| JP | H05179135 A | 7/1993 |

(Continued)

OTHER PUBLICATIONS

International Search Report issued in corresponding International Application No. PCT/JP2015/072430 with English translation dated Sep. 1, 2015 (5 pages).

*Primary Examiner* — Maria V Ewald
*Assistant Examiner* — Zachary M Davis
(74) *Attorney, Agent, or Firm* — Osha Liang LLP

(57) ABSTRACT

A resin composition includes 5 to 82 parts by weight of an aromatic polyester, 0 to 50 parts by weight of an aromatic polycarbonate, 10 to 90 parts by weight of a highly heat-resistant aromatic polycarbonate, 0 to 10 parts by weight of a graft-copolymer, 0 to 10 parts by weight of an ethylene copolymer, 2.5 to 50 parts by weight of a silicate filler, 0 to 10 parts by weight of an electric conductive filler, and 0 to 2 parts by weight of a phosphorus compound wherein the total amount of the components are 100 parts by weight. The total amount of the graft-copolymer and the ethylene copolymer is from 0.5 to 10 parts by weight, the silicate filler is at least one compound selected from mica and kaolin, and the resin composition has a deflection temperature under load of 130° C. or higher.

16 Claims, 3 Drawing Sheets

(51) Int. Cl.
  *C08K 5/49*   (2006.01)
  *C08L 51/04*  (2006.01)
  *B32B 27/36*  (2006.01)
  *C08L 67/03*  (2006.01)
  *C08K 3/34*   (2006.01)
  *C08L 23/08*  (2006.01)
  *B05D 1/00*   (2006.01)
  *B05D 3/02*   (2006.01)
  *B05D 7/02*   (2006.01)
  *B29C 45/00*  (2006.01)
  *C08L 67/02*  (2006.01)
  *B29K 67/00*  (2006.01)
  *B29K 69/00*  (2006.01)
  *B29K 105/00* (2006.01)
  *B29K 509/00* (2006.01)
  *B29L 31/30*  (2006.01)

(52) U.S. Cl.
  CPC ...... *B29C 45/0001* (2013.01); *B29C 45/0053* (2013.01); *B32B 27/36* (2013.01); *C08K 3/34* (2013.01); *C08K 5/49* (2013.01); *C08L 23/08* (2013.01); *C08L 51/04* (2013.01); *C08L 67/02* (2013.01); *C08L 67/03* (2013.01); *B29C 2045/0079* (2013.01); *B29K 2067/00* (2013.01); *B29K 2069/00* (2013.01); *B29K 2105/0023* (2013.01); *B29K 2509/00* (2013.01); *B29L 2031/3005* (2013.01); *C08L 2201/08* (2013.01); *C08L 2205/035* (2013.01)

(56) References Cited

FOREIGN PATENT DOCUMENTS

| | | |
|---|---|---|
| JP | H06505300 A | 6/1994 |
| JP | H06287446 A | 10/1994 |
| JP | H10237295 A | 9/1998 |
| JP | H11181268 A | 7/1999 |
| JP | 2002121373 A | 4/2002 |
| JP | 2003268300 A | 9/2003 |
| JP | 2004526848 A | 9/2004 |
| JP | 2007211108 A | 8/2007 |
| JP | 2007238684 A | 9/2007 |
| JP | 2008088334 A | 4/2008 |
| JP | 2010222393 A | 10/2010 |
| JP | 2010254739 A | 11/2010 |
| JP | 2011231280 A | 11/2011 |

* cited by examiner

[Fig. 1A]
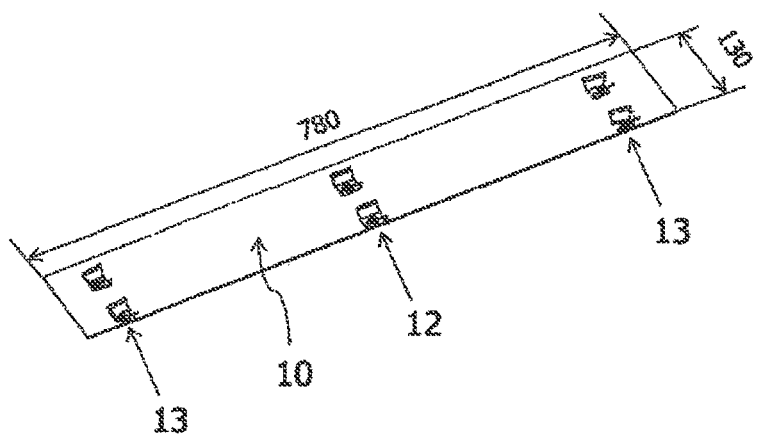
[Fig. 1B]
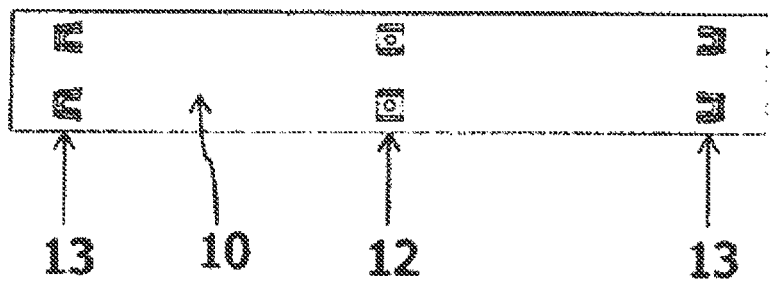
[Fig. 1C]
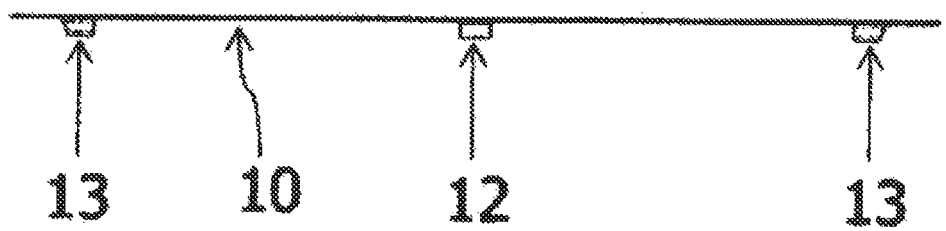

[Fig. 2A]
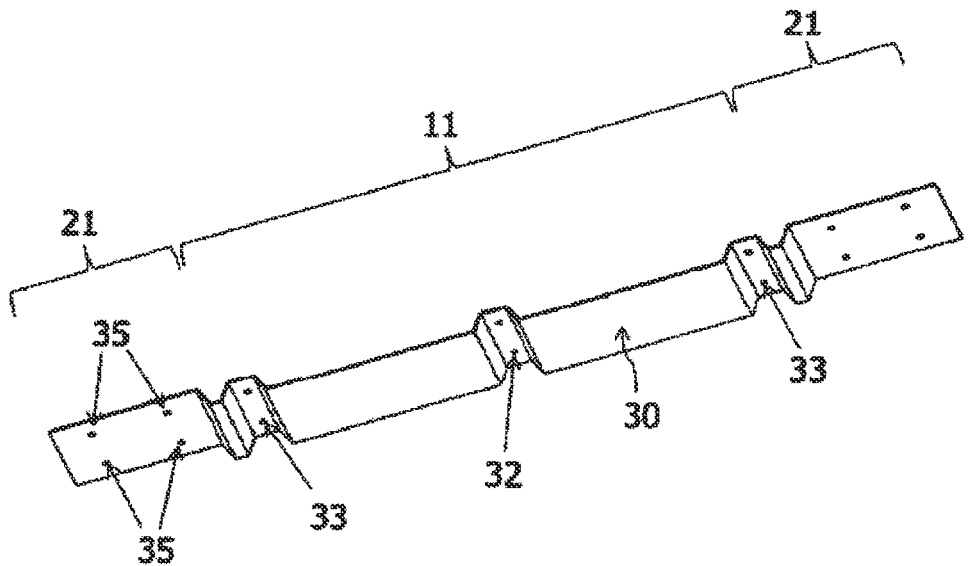
[Fig. 2B]
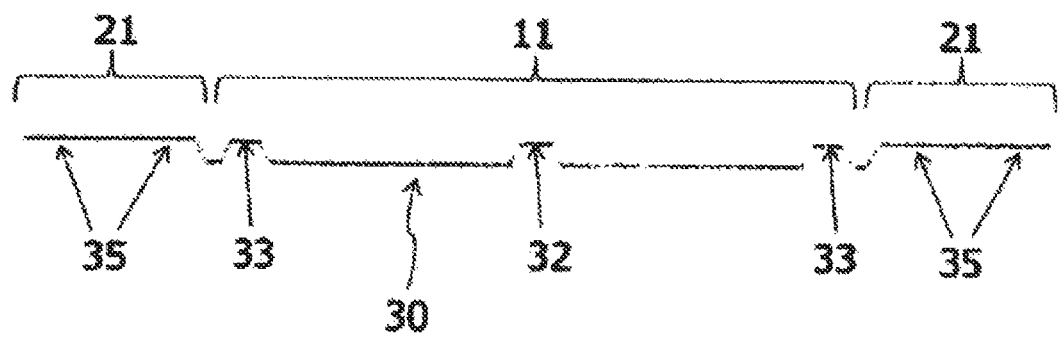
[Fig. 3A]
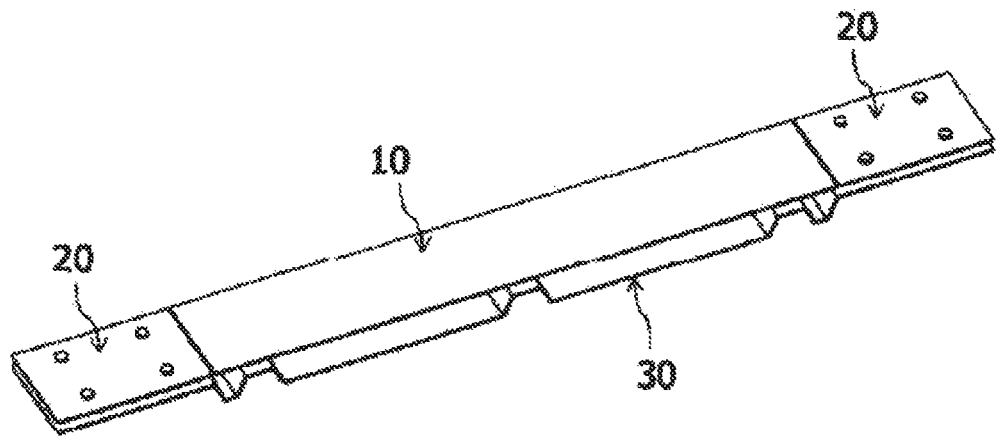

[Fig. 3B]
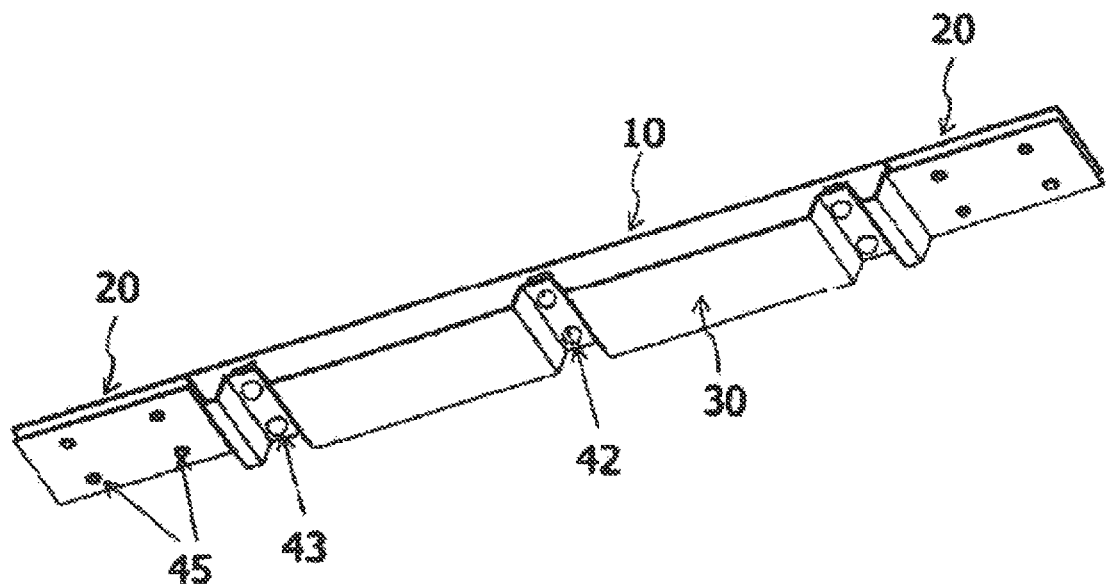
[Fig. 3C]
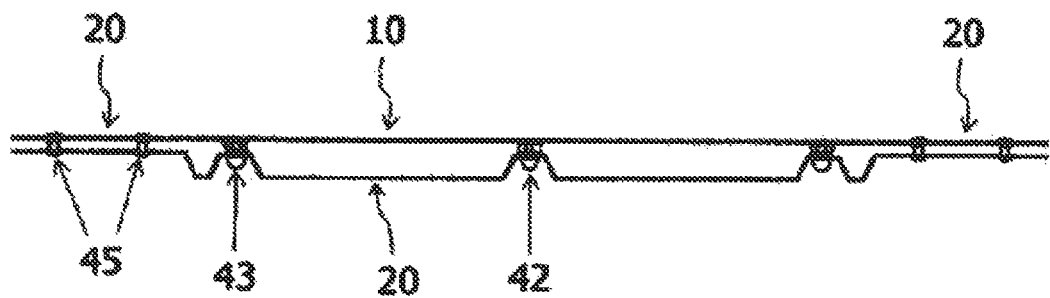

THERMOPLASTIC RESIN COMPOSITION AND MOLDED ARTICLE THEREOF

TECHNICAL FIELD

One or more embodiments of the present invention relates to a thermoplastic resin composition based on a filler-containing aromatic polycarbonate/aromatic polyester, having an excellent heat resistance and an improved impact resistance, and more particularly to a thermoplastic resin composition having an inhibited dimensional change due to temperature and a low dimensional change due to moisture of a molded article, and an excellent rigidity. One or more embodiments of the present invention also relate to a molded article obtained from the resin composition and an automobile outer panel member containing the molded article, and further to an automobile outer panel member which is coated by baking.

BACKGROUND

Recently, it is required to drastically improve an efficiency in the use of energy for automobiles, resulting from energy issues and environmental issues. In order to contribute to the accomplishment through weight reduction, a requirement in which metal parts are replaced by resin parts is growing remarkably.

Recently, as a thermoplastic resin composition used for an automobile member, resins compositions are known such as (heat-resistant)acrylonitrile-butadiene-styrene resins (ABS), alloys of an aromatic polycarbonate resin (PC) and an ABS resin (PC/ABS), and polypropylene resins (PP) filled with talc or glass fiber. These are inexpensive and have a good impact resistance at a low temperature, and have been usefully used. However, many of them have an insufficient rigidity, and thus it is necessary to increase a wall thickness of an article, in order to prevent a deformation caused by a load applied to the members during practical use. In a use to be exposed to severe sunlight irradiation, such as a spoiler, deformation may occur when a temperature of the member is elevated by the sunlight, and thus the resin composition may not be suitable to such a use.

Alloys of PC and an aromatic polyester resin are known as a material having an appropriate rigidity and a sufficient heat resistance in which a material does not deform even if a temperature of the member is elevated under severe sunlight irradiation. For example, an alloy of PC and a polyethylene terephthalate resin (PET) (PC/PET) and an alloy of PC and a polybutylene terephthalate resin (PBT) (PC/PBT) have been proposed. Of these, compositions based on PC/PET are proposed, because it is easy to obtain a large-sized article having inhibited warping during molding from the composition (Patent Documents 1 to 3). When the large-sized molded article formed from the PC/PET composition is assembled to a metal chassis of an automobile, strains are caused by difference in a coefficient of linear expansion due to temperature (a coefficient of linear thermal expansion) between the metal and the PC/PET composition, or the expanded PC/PET molded article is brought into contact with the metal portion at a high temperature to generate scratches. To avoid the defect described above, a design may sometimes be restricted. In order to solve the problems and to realize a molded article having a thin wall thickness to promote the weight reduction, a resin composition containing PC, PET, mineral filler, and bisol-modified PET is proposed (Patent Document 4). A molded article formed from this resin composition has the sufficient rigidity and the excellent resistance to the deformation caused by a load or heat in the practical usage environment, while it has a low coefficient of linear thermal expansion and whose wall thickness is reduced and thus whose weight is also reduced. However, when a part formed from the molded article is coated, the resin composition cannot stand a baking temperature applied to a melamine resin coating material used in base coating and clear coating process of automobile bodies (metal panel, and the like), i.e., 140° C. or higher, because the resin composition has a heat-resistant temperature of about 120 to 130° C. For that reason, it is necessary to use a different coating material capable of being baked at a low temperature of 120° C. or lower and different processes when the coating is performed. In that case, the coating system of the automobile bodies is different from the coating system of the parts formed from the molded article, and thus it is necessary to adjust colors of the coating materials to eliminate the slight color difference occurring between the two, but such an adjustment is quite difficult and the adjustment may sometimes be insufficient when a high design property is required. Even if the initial color adjustment is good, the color change with time on the automobile body is different from that on the part formed from the molded article and the colors vary when they are exposed to an outdoor environment for a long period of time, and thus the adjustment may also sometimes be insufficient when a high design property is required.

Patent Documents 5 and 6 disclose resin compositions in which a polystyrene (PSt) and rubber are admixed with a base of an alloy (PA/PPE) of polyamide resin (PA) and polyphenylene ether resin (PPE) to improve the impact strength, or a needle-like filler is admixed with the PA/PPE to reduce the coefficient of linear thermal expansion. The resin compositions above have a high heat-resistant temperature, and, in a molded article thereof, the thermal deformation is inhibited at a higher temperature of 140° C. or higher. A method to eliminate the occurrence of the color difference between a part and an automobile body is, accordingly, proposed in which a part, obtained by molding a resin composition, is previously assembled to an electrodeposition-coated metal automobile body to integrate them, and then the resulting article is subjected to a generally called "in-line coating" in which an article is coated with a coating material and the baking is performed. In this method, a high hygroscopic property of the resin composition containing PA as the main component may sometimes cause problems as follows. In dry areas such as Europe, the dimension can be stably maintained and the composition distributes the solution of the problems described above, but in humid areas such as Southeast Asia, the deformation caused by moisture absorption easily occurs. To cope with this, the number of joints between the automobile body made of metal and resin parts should be increased, or in order to prevent the generation of scratches, caused by the contact with the metal part, a large gap is required between the metal part and the resin part. The following problems may occur such as occurrence of a failure caused by moisture absorption during the coating, and occurrence of a defect by a poor adhesion with a coating layer because PA forming a continuous phase is a crystalline resin.

Similarly, in order to solve the occurrence of the inferiors caused by the humidity change described above or the coating defect caused by the continuous phase made of the crystalline resin by aiming at elevating the heat-resistant temperature, a resin composition is proposed in which a highly heat-resistant polycarbonate resin having a specific alicyclic structure in its molecule, PET, an elastomeric polymer, filler and/or a reinforcing material are used (Patent Document 7). It is assumed that a part obtained by molding the resin composition is subjected to an in-line coating as the case of the PA/PPE. Although Patent Document 7 does not clearly describe what kind of a base resin is used in the coating material when the in-line coating is performed, according to Patent Document 7, the part obtained from the resin composition can keep a surface smoothness thereof good, and a coating surface with an excellent appearance can be obtained, even after the in-line coating. When a baking process using a melamine resin coating material is accompanied, however, the heat resistance of the resin composition is insufficient, and the part itself may sometimes be deformed at a high temperature, and a shape of the design or a size of the part may sometimes be restricted. In a case of large-sized outer panel, the difference in the coefficient of linear thermal expansion with the metal site becomes a problem, and there is a restriction in terms of the design; for example, it is necessary to make a large gap for avoiding interference, and improvements are required.

CITATION LIST

Patent Literature

Patent Document 1: JP-A-2011-231280
Patent Document 2: JP-A-2010-222393
Patent Document 3: JP-A-2002-121373
Patent Document 4: JP-A-2010-254739
Patent Document 5: JP-A-H6-287446
Patent Document 6: JP-A-H5-179135
Patent Document 7: JP-T-2004-526848

SUMMARY

One or more embodiments of the present invention provide a resin composition suitable for automobile exterior and outer panel member, which has an excellent flowability during processing, and which is capable of providing a molded article, which maintains a good surface property even after it is exposed to a high temperature of 140° C. or higher in a baking process of a melamine resin coating material, which is used in coating process of an base coating and a topcoat coating of an automobile in terms of the design, the baking process being performed in order to maintain the consistency with a coating appearance of metal sites; which has a small thermal deformation caused by exposure to a high temperature during the baking; which has an excellent design, because the deformation, caused by the linear thermal expansion and the change in the humidity, is inhibited and thus when it is assembled to a metal member, a gap between them may be made small; which is light weight; which has an improved degree of freedom of the design; and which has excellent rigidity, impact property, chemical resistance, and coatability. In addition, one or more embodiments of the present invention provide a molded article using the resin composition, and an automobile member into which the molded article is incorporated.

The present inventors have focused on a deflection temperature under load, which has been still kept low, in the resin composition of Patent Document 7, although in the resin composition a highly heat-resistant polycarbonate resin is employed, because it is necessary that an elastomeric polymer is contained in a large amount of 12% by weight or more, in order to sufficiently increase an impact strength at low temperatures of the resin composition, and talc or wollastonite, which is filler, is contained in a small amount of 10% by weight or less, as particularly shown in Examples, whereby increase of a Vicat softening temperature is succeeded. It has been found that this causes deformation on a member, which occurs when a member obtained by molding the resin composition is coated with a melamine resin coating material, and is subjected to a baking process.

The present inventors have repeated earnest study, and found that when a specific amount or more of a specific filler is applied to a highly heat-resistant polycarbonate resin (HHPC), an aromatic polycarbonate resin (PC) other than HHPC if necessary, and an alloy of an aromatic polyester, and an addition amount of an elastomeric polymer is reduced, thereby increasing a deflection temperature under load of an obtained resin composition. With this, an impact strength can be sufficiently exhibited particularly at a low temperature, and a coefficient of linear thermal expansion can be reduced, while the deformation of the member can be inhibited at a high temperature during the baking process performed on the melamine resin coating material.

The resin composition according to one or more embodiments of the present invention is, accordingly, a resin composition containing: 5 to 82 parts by weight of an aromatic polyester (component A); 0 to 50 parts by weight of an aromatic polycarbonate (component B) having a deflection temperature under load, measured in accordance with ASTM D648 (A method), of between 110° C. and 140° C.; 10 to 90 parts by weight of a highly heat-resistant aromatic polycarbonate (component C) having a deflection temperature under load, measured in accordance with ASTM D648 (A method), of 145° C. or higher; 0 to 10 parts by weight of a graft-copolymer (component D) containing 40 to 90% by weight of a rubbery polymer having a glass transition temperature (Tg) of −10° C. or lower; 0 to 10 parts by weight of an ethylene copolymer (component E); 2.5 to 50 parts by weight of a silicate filler (component F); 0 to 10 parts by weight of an electric conductive filler (component G); and 0 to 2 parts by weight of a phosphorus compound (component H), provided that the total amount of the all components are 100 parts by weight, wherein the total amount of the component D and the component E is from 0.5 to 10 parts by weight, the component F is at least one compound selected from mica and kaolin, and the resin composition has a deflection temperature under load, measured in accordance with ASTM D648 (A method), of 130° C. or higher.

An embodiment is the resin composition wherein the aromatic polyester (component A) contains 50 to 100% by weight of a polyalkylene terephthalate (component A1) and 0 to 50% by weight of a polyoxyalkylene-modified polyalkylene terephthalate (component A2).

In another embodiment, the polyalkylene terephthalate (component A1) is polymerized using a germanium catalyst.

In another embodiment, the polyalkylene terephthalate (component A1) is produced using a titanium-phosphorus catalyst.

Another embodiment is the resin composition wherein the polyalkylene terephthalate (component A1) is produced using an antimony catalyst, and the phosphorus compound (component H) is used in an amount of 0.01 to 1 part by weight.

In another embodiment, the polyoxyalkylene-modified polyalkylene terephthalate (component A2) is polymerized using at least one catalyst selected from the group consisting of a germanium catalyst, a titanium catalyst, and an aluminum catalyst.

Another embodiment is the resin composition, wherein the aromatic polycarbonate (component B) is a 2,2-bis(4-hydroxyphenyl)propane ("bisphenol A")-based polycarbonate.

Another embodiment is the resin composition, wherein the highly heat-resistant aromatic polycarbonate (component C) is a polycarbonate containing at least one monomer unit selected from the group consisting of bis(hydroxyaryl) cycloalkane, bis(hydroxyaryl)fluorene, bis(hydroxyaryl) adamantane, and dihydroxytetraarylmethane.

Another embodiment is the resin composition, wherein the highly heat-resistant aromatic polycarbonate (component C) is a polycarbonate formed of 1,1-bis-(4-hydroxyphenyl)-3,3,5-trimethylcyclohexane ("bisphenol TMC") and bisphenol A.

Another embodiment is the resin composition, wherein the highly heat-resistant aromatic polycarbonate (component C) is a polycarbonate formed of a bis(4-(2-hydroxyethoxy)phenyl)fluorene compound and a dihydroxybenzene compound and/or a dihydroxynaphthalene compound.

Another embodiment is the resin composition, wherein the highly heat-resistant aromatic polycarbonate (component C) is a polycarbonate formed of a bis(4-hydroxyphenyl) fluorene compound and bisphenol A and/or α',α'-bis(4-hydroxyphenyl)-m-diisopropyl benzene ("bisphenol M").

Another embodiment is the resin composition, wherein the highly heat-resistant aromatic polycarbonate (component C) is a polycarbonate formed of 2,2-bis(4-hydroxyphenyl)adamantane and 1,1-bis(4-hydroxyphenyl)cyclohexane.

Another embodiment is the resin composition, wherein the silicate filler (component F) is used in an amount of 10.5 to 29 parts by weight in the resin composition, and in another embodiment, mica having a volume average particle size, measured in accordance with a laser diffraction method, of 0.5 to 45 μm, is used.

Another embodiment is the resin composition, which further contains an amorphous thermoplastic resin (component L) other than the polycarbonate resin in an amount of 0.5 to 15 parts by weight.

Another embodiment is the resin composition, wherein when the composition is processed into a type A1 dumbbell prescribed in ISO 20753, the molded article has a coefficient of linear thermal expansion in a direction of resin flow, measured in accordance with ISO 11359-2, of $5 \times 10^{-5}$ or less.

Another embodiment is the resin composition, whose molded article has a flexural modulus, measured in accordance with ISO 178, of 3000 MPa or more.

Another embodiment of the present invention is a molded article obtained by molding the resin composition described above, which has a projected area of 40,000 mm² or more and an average thickness of 5 mm or less. Another embodiment is an exterior and outer panel member for an automobile containing the molded article.

Another embodiment of the present invention is the molded article, which is subjected to a coating-layer curing process at a baking temperature of 60° C. to 170° C. after a coating material is coated.

Another embodiment of the present invention is a multilayer composite containing the molded article described above, and at least one cured resin selected from the group consisting of a cured polyester melamine resin, a cured alkyd melamine resin, a cured acrylic melamine resin, a cured acid epoxy resin, and a cured acrylic urethane resin.

The resin composition according to one or more embodiments of the present invention can provides a molded article, which maintains a good surface property even after it is exposed to a high temperature of 140° C. or higher in a baking process of an base coating and a clear coating of an automobile, the baking process being performed in order to maintain the consistency with a coating appearance of metal sites; which has a small deformation caused by exposure to a high temperature during the baking; which has an excellent design even if it is assembled to a metal member because the deformation, caused by the linear thermal expansion and the change in the humidity, is inhibited; which can realize the weight reduction; which has a high degree of freedom of the design; which has excellent rigidity, impact property, chemical resistance, and adhesion of coating layer; and which has excellent flowability during processing. The molded article according to one or more embodiments of the present invention is suitable for the automobile exterior and outer panel member.

BRIEF DESCRIPTION OF THE DRAWINGS

FIG. 1A is a perspective view showing a surface of a molded article (10) which is supposed as an automobile outer panel member in Examples 27 to 52 of one or more embodiments of the present invention.

FIG. 1B is a back surface view showing a molded article (10), which is supposed as an automobile outer panel member of Examples 27 to 52 of one or more embodiments of the present invention.

FIG. 1C is a side view showing a molded article (10), which is supposed as an automobile outer panel member of Examples 27 to 52 of one or more embodiments of the present invention.

FIG. 2A is a perspective view on a surface side showing a jig (30) for evaluating a coatability of a molded article of Examples 27 to 52 of one or more embodiments of the present invention.

FIG. 2B is a side view showing a jig (30) for evaluating a coatability of a molded article of Examples 27 to 52 of one or more embodiments of the present invention.

FIG. 3A is a surface perspective view showing a jig (30) for evaluating a coatability, to which a molded article (10) of Examples 27 to 52 of one or more embodiments of the present invention and a steel plate (20) are attached in order to evaluate the coatability.

FIG. 3B is a back surface perspective view showing a jig (30) for evaluating a coatability, to which a molded article (10) of Examples 27 to 52 of one or more embodiments of the present invention and a steel plate (20) are attached in order to evaluate the coatability.

FIG. 3C is a side view showing a jig (30) for evaluating a coatability, to which a molded article (10) of Examples 27 to 52 of one or more embodiments of the present invention and a steel plate (20) are attached in order to evaluate the coatability.

DESCRIPTION OF EMBODIMENTS

One or more embodiments of the present invention are explained below, but the present invention is not limited to the following explanations.

The resin composition according to one or more embodiments of the present invention is a resin composition containing: 5 to 82 parts by weight of an aromatic polyester (component A); 0 to 50 parts by weight of an aromatic polycarbonate (component B) having a deflection temperature under load, measured in accordance with ASTM D648 (A method), of between 110° C. and 140° C.; 10 to 90 parts by weight of a highly heat-resistant aromatic polycarbonate (component C) having a deflection temperature under load, measured in accordance with ASTM D648 (A method), of 145° C. or higher; 0 to 10 parts by weight of a graft-copolymer (component D) containing 40 to 90% by weight of a rubbery polymer having a glass transition temperature (Tg) of −10° C. or lower; 0 to 10 parts by weight of an ethylene copolymer (component E); 2.5 to 50 parts by weight of a silicate filler (component F); 0 to 10 parts by weight of an electric conductive filler (component G); and 0 to 2 parts by weight of a phosphorus compound (component H), provided that the total amount of the all components are 100 parts by weight, wherein the total amount of the component D and the component E is from 0.5 to 10 parts by weight, the component F is at least one compound selected from mica and kaolin, and the resin composition has a deflection temperature under load, measured in accordance with ASTM D648 (A method), of 130° C. or higher.

In the resin composition according to one or more embodiments of the present invention, in terms of a balance among the impact resistance, the heat resistance, the dimensional stability, the chemical resistance, and the molding processability, the amount of the aromatic polyester (component A) used in the total amount of the resin composition, 100 parts by weight, is as described above, and the lower limit may be 10 parts by weight, or 20 parts by weight and the upper limit may be 50 parts by weight, or 40 parts by weight, in terms of the impact resistance. For the similar reason, the amount of the aromatic polycarbonate (component B) used is as described above, and the lower limit may be 5 parts by weight, or 10 parts by weight in terms of the impact resistance, and the upper limit may be 40 parts by weight, 30 parts by weight, or 20 parts by weight in terms of the heat resistance. For the same reason, the amount of the highly heat-resistant aromatic polycarbonate (component C) used is as described above, and the lower limit may be 21 parts by weight, 31 parts by weight, or 41 parts by weight in order not to impair the heat resistance and the upper limit may be 79 parts by weight, 69 parts by weight, or 59 parts by weight in terms of the impact resistance.

In the resin composition according to one or more embodiments of the present invention, in order to obtain a good balance among the heat resistance, the impact resistance, and the linear thermal expansion, a ratio of the amount of the highly heat-resistant aromatic polycarbonate (component C) to the total amount of the aromatic polycarbonate (component B) and the highly heat-resistant aromatic polycarbonate (component C) may be adjusted to 16.7 to 100.0%, and the lower limit may be 47.0%, 51.0%, 64.0%, or 71.0% and the upper limit may be 94.5%, 89.5%, or 84.9%.

In the composition according to one or more embodiments of the present invention, in order to obtain a good balance among the impact resistance, the heat resistance, the surface appearance, and the chemical resistance, a ratio of the amounts of the aromatic polycarbonate (component B) and the highly heat-resistant aromatic polycarbonate (component C) to the total amount of the aromatic polyester (component A), the aromatic polycarbonate (component B), and the highly heat-resistant aromatic polycarbonate (component C) may be adjusted to 10.9 to 94.7%, and the lower limit may be 30.5%, 50.5%, or 55.5%, and the upper limit may be 89.5%, 80.5%, or 74.5%. As used herein, "%" means "% by weight."

In the resin composition according to one or more embodiments of the present invention, in order to obtain a good balance among the impact resistance, the heat resistance, and the linear thermal expansion, the graft-copolymer (component D) and the ethylene copolymer (component E) are used in the amounts described above in the total amount of the resin composition, 100 parts by weight, and the total amount of the component D and the component E is from 0.5 to 10 parts by weight. The component D and the component E can be each used alone but the combination thereof may be used because the impact resistance becomes better in a wide temperature range. With respect to the amount of the graft-copolymer (component D) used, the lower limit may be 0.1 parts by weight, 1.1 parts by weight, or 2.1 parts by weight in terms of the improved impact resistance at a low temperature, and the upper limit may be 9.9 parts by weight, 6.9 parts by weight, or 4.9 parts by weight in order to inhibit the coefficient of linear thermal expansion. With respect to the amount of the ethylene copolymer (component E) used, the lower limit may be 0.1 parts by weight, 0.6 parts by weight, 1.1 parts by weight, or 3.1 parts by weight in terms of the improved impact resistance at an ordinary temperature, and the upper limit may be 9.9 parts by weight, 6.9 parts by weight, or 4.9 parts by weight, in order to inhibit the coefficient of linear thermal expansion and inhibit molding failure such as exfoliation. The graft-copolymer (component D) and the ethylene copolymer (component E) may be used in combination, and the lower limit of the total amount thereof may be adjusted to 1.1 parts by weight, 3.1 parts by weight, or 5.1 parts by weight, and the upper limit may be adjusted to 9.9 parts by weight, 7.9 parts by weight, or 6.9 parts by weight. When the both components are used, the impact resistance at an ordinary temperature and a low temperature is more improved compared to a case in which the component D or the component E is used alone in the same amount, or the amount used for obtaining the same level of the impact resistance obtained in the case in which the component D or the component E is used alone can be reduced, thus resulting in the suppressed linear thermal expansion. When inhibition of a thermal deterioration in the mechanical properties for a long period of time is focused on, in the system of both of the graft-copolymer (component D) and the ethylene copolymer (component E) used, a ratio of the amount of the component E in the total amount of the component D and the component E may be adjusted to 50% by weight or more, such as 75% by weight or more, or such as 90% by weight or more, and it is possible to use the component E alone.

In the resin composition according to one or more embodiments of the present invention, in order to obtain a good balance among the impact resistance, the rigidity, the heat resistance, the linear thermal expansion, and the surface appearance, the silicate filler (component F) is used in the amount described above, and the lower limit may be 4.5 parts by weight, 5.5 parts by weight, 6.5 parts by weight or more, 10.5 parts by weight, or 12.5 parts by weight, in order to suppress the coefficient of linear thermal expansion and increase the rigidity and the heat resistance, and the upper limit may be 34 parts by weight or less, such as 29 parts by weight or less, such as 24 parts by weight or less, or such as 15 parts by weight or less, in order not to reduce the impact resistance and improve the surface appearance, and a range of 10.5 to 29 parts by weight may be used.

When the molded article according to one or more embodiments of the present invention is previously subjected to an electric conductive primer coating in a sufficient amount, then is assembled to a metal member to integrate them, after that the resulting article is subjected to a coating process using a melamine resin coating material, in which an electrostatic coating is performed or is not performed, there is a case in which it is not required to have the electric conductivity for the molded article. In such a case, it is possible to adjust the amount of the electric conductive filler (component G) to 0 parts by weight in the resin composition. On the other hand, when the electric conductive primer coating is not performed or the electric conductive primer coating is performed in an insufficient amount of the primer, then is integrated with a metal member, after that the resulting article is subjected to the melamine resin coating process as described above, in which the electrostatic coating is performed (generally called an "in-line coating," and the like), the electric conductive filler (component G) may be used in a lower limit amount of 0.001 parts by weight, or 0.006 parts by weight in the resin composition, in order to improve the process safety and the coating efficiency in the coating process. The upper limit may be as described above, in order not to reduce the impact resistance, and it may be 7.9 parts by weight, or 4.9 parts by weight. Here, the electrostatic coating is a coating method in which a positive or negative voltage is applied to a metal member and the molded article, a voltage with opposite polarity is applied to a coating material mist when the mist is sprayed, whereby the oppositely charged coating material mist is obtained, and utilizing the electrostatic attraction effect generated, the coating material mist is stuck to the metal member and the molded article, thereby efficiently forming a uniform coating layer.

In the resin composition according to one or more embodiments of the present invention, in order to improve the thermal stability during the mold-processing to reduce an amount of decomposed gas generated and to improve the surface appearance of the molded article, it is possible to use the phosphorus compound (component H). For the purpose described above, the lower limit thereof may be 0.002 parts by weight, 0.01 parts by weight, or 0.1 parts by weight. The upper limit may be 2 parts by weight, 1 part by weight, or 0.5 parts by weight, in order to prevent the occurrence of the poor appearance caused by bleed out, or the like.

It is essential that the resin composition according to one or more embodiments of the present invention has a deflection temperature under load, measured in accordance with ASTM D648 (A method), of 130° C. or higher, in order to have the good heat resistance and to inhibit the thermal deformation caused during the baking of the melamine resin coating material, and it may be 140° C. or higher, such as 150° C. or higher. The upper limit is not limited, but it may be 220° C., 200° C., or 180° C., in terms of the easy mold-processing.

In order not to excessively increase the clamp between the molded article and metal site of the automobile body, as a measurement against the deformation caused by the difference in the coefficient of linear thermal expansion between the molded article obtained from the resin composition and the metal part, and in order to reduce the necessary gap and improve the design as a measurement against a physical interference caused by the difference in the coefficient of linear thermal expansion, when the resin composition is processed into a type A1 dumbbell prescribed in ISO 20753, the molded article may have a coefficient of linear thermal expansion in the flow direction, measured in accordance with ISO 11359-2, of $5\times10^{-5}$ or less, such as $4.5\times10^{-5}$ or less, or such as $4\times10^{-5}$ or less.

When the resin composition according to one or more embodiments of the present invention is used as an automobile member, in order to secure the product rigidity of the molded article or the final product, the resin composition may have a flexural modulus, measured in accordance with ISO 178, of 3000 MPa or more. The flexural modulus may be 3500 MPa or more, in order to obtain a molded article having a thickness of less than 3 mm while the product rigidity is maintained for the purpose of the weight reduction, and such as 4000 MPa or more, or such as 5000 MPa or more, when the thickness is set to about 1.5 to 2.5 mm.

<Aromatic Polyester (Component A)>

The aromatic polyester (component A) used in the resin composition according to one or more embodiments of the present invention is a polycondensate having both of an ester bond and an aromatic ring represented by benzene ring in the main chain. The component A includes polyesters having a structure derived from a combination of a dicarboxylic acid unit and a diol unit; polyesters having a structure derived from a compound unit having both of one or more carboxylic acid groups and one or more hydroxyl groups in one molecule; and combinations thereof. It is possible to use an aromatic compound in which the aforementioned dicarboxylic acid is an aromatic dicarboxylic acid, and/or the aforementioned diol is an aromatic diol, or an aromatic compound in which one or more carboxylic acids as a substituent of the aromatic ring bonded directly or through a hydrocarbon chain and one or more hydroxyl groups are bonded to directly or through a hydrocarbon chain, or the like.

Examples of the aromatic dicarboxylic acid may include terephthalic acid, isophthalic acid, naphthalene dicarboxylic acid, and the like. It is possible to use a dicarboxylic acid containing no aromatic ring, such as itaconic acid, succinic acid, adipic acid, sebacic acid, and the like, but when they are used, the aromatic diol or the aromatic compound having one or more carboxylic acid groups and one or more hydroxyl groups in one molecule is used in combination with them.

Examples of the aromatic diol may include catechol, resorcinol, hydroquinone, bisphenol compounds such as 2,2-bis(4-hydroxyphenyl)propane ("bisphenol A") and 1,1-bis-(4-hydroxyphenyl)-3,3,5-trimethylcyclohexane ("bisphenol TMC"), biphenol compounds such as 4,4'-biphenol, and the like. Examples of the diol having no aromatic ring may include ethylene glycol (EG), 1,2-propane diol, 1,3-propane diol (also called as trimethylene glycol), 1,4-butane diol, methylpentane diol, cyclohexane diol, cyclohexane dimethanol, nonane diol, and the like. When they are used, the aromatic dicarboxylic acid or the aromatic compound having one or more carboxylic acid groups and one or more hydroxyl groups in one molecule is used in combination with them.

Of the aromatic polyesters (component A), a polyalkylene terephthalate (component A1), described below, can be used, because it is industrially easily obtainable, and the good surface appearance and chemical resistance can be obtained.

In one or more embodiments of the present invention, in order to improve the flowability, the aromatic polyester (component A), a polyoxyalkylene-modified polyalkylene terephthalate (component A2), described below, in combination with a polyalkylene terephthalate (component A1), may be used. In this case, in order not to worsen the heat resistance and the surface appearance, with respect to an amount of the component A1 used in the total amount of the component A1 and the component A2, the lower limit may be 50% by weight, 60% by weight, or 70% by weight, and with respect to an amount of the component A2 used, the upper limit may be 50% by weight, 40% by weight, or 30% by weight. On the other hand, the upper limit amount of the component A1 used may be 100% by weight, or 95% by weight in terms of providing of the flowability. The lower limit amount of the component A2 used may be 0% by weight, or 5% by weight.

<Polyalkylene Terephthalate (Component A1)>

As the polyalkylene terephthalate (component A1), polyethylene terephthalate (PET), polytrimethylene terephthalate (PPT), polybutylene terephthalate (PBT), polyethylene naphthalate (PEN), or polycyclohexane dimethylene terephthalate (PCT) may be used. The polyethylene terephthalate may be used because it has the particularly excellent surface appearance, and the excellent moldability and heat resistance.

The polyalkylene terephthalate (component A1) can be obtained, for example, by conducting polycondensation on a bishydroxyalkyl terephthalate in the presence of a polymerization catalyst under a reduced pressure, until a desired molecular weight is obtained. Here, the bishydroxyalkyl terephthalate to be used may be obtained by reacting dimethyl terephthalate (DMT) with the diol having no aromatic ring or a commercially available bishydroxyalkyl terephthalate may also be used. The molecular weight is measured as a logarithmic viscosity (IV) of a solution thereof having a concentration of 0.5 g/dl in a mixed solvent of tetrachloroethane/phenol=50/50 (weight ratio) at 25° C. The logarithmic viscosity may be 0.6 or more in terms of the impact resistance, and may be 1.5 or less in terms of the flowability during the processing in an injection molding.

The polyalkylene terephthalate (component A1) produced using a polymerization catalyst selected from the group consisting of a germanium catalyst, a titanium catalyst, an aluminum catalyst, and an antimony catalyst may be used. The polymerization catalyst remains in the polyalkylene terephthalate (component A1) as a residue, and when it is kneaded with the highly heat-resistant aromatic polycarbonate (component C) and the aromatic polycarbonate (component B) if necessary, an unexpected transesterification may sometimes occur, thus resulting in the deterioration in physical property and the poor appearance, and thus the selection and the use form may sometimes be important.

In order to improve the thermal stability of the resin composition according to one or more embodiments of the present invention and to suppress the decomposed gas generated during the mold-processing, thereby to improve the surface appearance, the component A1 produced using the germanium catalyst may be used. The germanium catalyst may include germanium oxides such as germanium dioxide; germanium alkoxides such as germanium tetraethoxide and germanium tetraisopropoxide; germanium hydroxide and alkali metal salts thereof germanium glycolate, germanium chloride, germanium acetate, and the like. They are used alone or as a mixture of two or more kinds. Of these germanium compounds, germanium dioxide may be used, because an unnecessary residue is not produced. The upper limit amount of the germanium dioxide catalyst, thrown at the polymerization may be 1000 ppm or less in terms of the economy, such as 500 ppm or less, or such as 200 ppm or less, in order to improve the thermal stability of the resin composition. The lower limit amount may be 10 ppm or more, such as 50 ppm or more, in terms of the productivity.

A content of the germanium metal in the polyalkylene terephthalate (component A1) may be 5 ppm or more and 500 ppm or less, such as 10 ppm or more and 400 ppm or less, because it may cause an unexpected transesterification when it is kneaded with the highly heat-resistant aromatic polycarbonate (component C) and the aromatic polycarbonate (component B) if necessary, thus resulting in the deteriorated physical properties and the poor appearance.

A content of the titanium metal in the polyalkylene terephthalate (component A1) may be 5 ppm or more and 100 ppm or less, such as 10 ppm or more and 50 ppm or less, because it may cause an unexpected transesterification when it is kneaded with the highly heat-resistant aromatic polycarbonate (component C) and the aromatic polycarbonate (component B) if necessary, thus resulting in the deteriorated physical properties and the poor appearance.

A content of the aluminum metal in the polyalkylene terephthalate (component A1) may be 5 ppm or more and 100 ppm or less, such as 10 ppm or more and 50 ppm or less, because it may cause an unexpected transesterification when it is kneaded with the highly heat-resistant aromatic polycarbonate (component C) and the aromatic polycarbonate (component B) if necessary, thus resulting in the deteriorated physical properties and the poor appearance.

A content of the antimony metal in the polyalkylene terephthalate (component A1) may be 5 ppm or more and 100 ppm or less, such as 10 ppm or more and 50 ppm or less, because it may cause an unexpected transesterification when it is kneaded with the highly heat-resistant aromatic polycarbonate (component C) and the aromatic polycarbonate (component B) if necessary, thus resulting in the deteriorated physical properties and the poor appearance.

A polyalkylene terephthalate (component A1) produced using the titanium catalyst in the resin composition may be used, since the titanium catalyst can contribute to the security of the thermal stability, next to the germanium catalyst and it is inexpensively obtainable. As the titanium catalyst, it is possible to use, for example, tetraethoxytitanium, or compounds represented by the following formula 1, and the like. In order to improve the thermal stability during the mold-processing, a polyalkylene terephthalate (component A1) may be used which is obtained by a polymerization in the presence of a titanium-phosphorus catalyst obtained by reacting, with a phosphorus compound represented by the following formula 3 or a salt thereof, the compound represented by the following formula 1, or a titanium compound obtained by reacting the compound represented by the following formula 1 with an aromatic polybasic carboxylic acid represented by the following formula 2 or an acid anhydride thereof.

[Chem. 1]

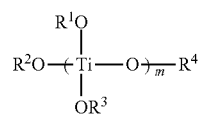

(Formula 1)

(wherein $R^1$ to $R^4$ represent each independently a hydrocarbon group having 2 to 10 carbon atoms, and m is an integer of 1 to 3.)

[Chem. 2]

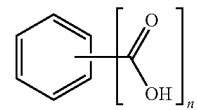

(Formula 2)

(wherein n is an integer of 2 to 4.)

[Chem. 3]

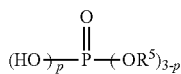
(Formula 3)

(wherein $R^5$ represents an unsubstituted or substituted hydrocarbon group having 6 to 20 carbon atoms, and p is 1 or 2.)

For the same reason, it is possible to use a polyalkylene terephthalate (component A1), particularly polyethylene terephthalate, which is obtained by a polymerization in the presence of a compound represented by the following formula 4.

[Chem. 4]

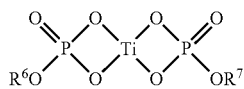
(Formula 4)

(wherein $R^6$ and $R^7$ represent an alkyl group having 2 to 12 carbon atoms or an aryl group having 6 to 12 carbon atoms, each of which is independently unsubstituted or substituted.)

On the other hand, when a polyalkylene terephthalate (component A1), obtained using the antimony compound, which is industrially obtainable at a low cost, as the catalyst, is simply used, the thermal decomposition reaction or the transesterification with the aromatic polycarbonate (component B) or the highly heat-resistant aromatic polycarbonate (component C) is promoted, whereby gas is generated, and thus the appearance of the molded article is often problematically impaired, due to the influence of the antimony catalyst, which remains with the catalyst activity, when the resin composition is produced or the mold-processing is performed. When the polyalkylene terephthalate (component A1), obtained using the antimony compound as the polymerization catalyst, is used, in order to reduce the influence described above of the antimony compound, a phosphorus compound (component H), described in detailed below, may be used in combination. The phosphorus compound (component H) is used in the amount described above.

<Phosphorus Compound (Component H)>

In one or more embodiments of the present invention, as the phosphorus compound, it is possible to use acidic phosphoric acid, the acidic phosphoric ester represented by the formula 3 described above, or salts thereof with an alkali metal, alkaline earth metal, aluminum, or zinc, oxaphosphorine compounds, phosphorous ester, phosphonic acid derivatives, phosphinic acid derivatives, and the like. Examples of the salt of the acidic phosphoric acid may include sodium dihydrogen pyrophosphate, sodium dihydrogen phosphate, calcium dihydrogen phosphate, and the like. Examples of the acidic phosphoric ester or salts thereof may include compounds represented by the following formulas 5 to 7. Examples of the oxaphosphorine compounds may include a compound represented by the following formula 8 or derivatives thereof, and the like. Examples of the phosphite may include a compound represented by the following formula 9. Examples of the phosphonic acid derivatives may include aluminum salts and zinc salts of n-octadecyl phosphonic acid or benzyl phosphonic acid, and the like. Examples of the phosphinic acid derivatives may include aluminum salts and zinc salts of diphenyl phosphinic acid or diethyl phosphinic acid, and the like. As a phosphorus compound (component H), it is possible to use the acidic phosphoric ester represented by the following formula 5, calcium dihydrogen phosphate, and the like.

[Chem. 5]

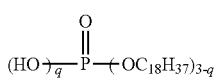
(Formula 5)

(wherein q is 1 or 2.)

[Chem. 6]

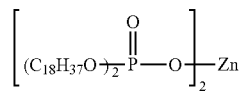
(Formula 6)

[Chem. 7]

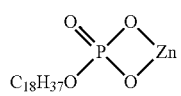
(Formula 7)

[Chem. 8]

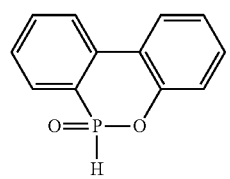
(Formula 8)

[Chem. 9]

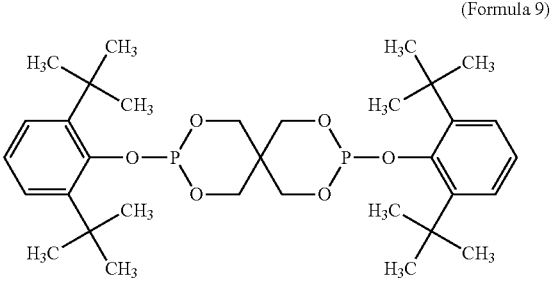
(Formula 9)

<Polyoxyalkylene-Modified Polyalkylene Terephthalate (Component A2)>

The polyoxyalkylene-modified polyalkylene terephthalate (component A2), used in one or more embodiments of the present invention, is a component which adjusts a melt viscosity of the aromatic polyester (component A) and controls the flowability of the resin composition, which contributes to the improvement of the flowability. The polyoxyalkylene-modified polyalkylene terephthalate (component A2) has a structure in which the polyalkylene terephthalate (component A1) is copolymerized with a polyoxyalkylene component. A block-copolymer containing the component A1 as a hard segment and the polyoxyalkylene component as a soft segment may be used.

Examples of the polyoxyalkylene component may include polyoxyethylene, polyoxy-1,2-propylene, polyoxy-1,3-propylene, and polyoxy-1,4-butylene. In one or more embodiments of the present invention, the concept of the polyoxyalkylene component includes adducts of the component described above to bisphenols including bisphenol A, biphenols including 4,4'-biphenol, or dicarboxylic acids such as terephthalic acid. With respect to the chain number of oxyalkylene repeating units in the polyoxyalkylene component, the lower limit may be 2, 4, 8, or 14, in order to improve the flowability, and the upper limit may be 100, 60, 30, or 20 in order to maintain the heat resistance or the thermal stability.

With respect to an amount of the polyoxyalkylene component incorporated into the polyoxyalkylene-modified polyalkylene terephthalate (component A2) used in one or more embodiments of the present invention, the lower limit may be 5% by weight, or 10% by weight, in order to exhibit the effect of improving the flowability after the copolymerization. The upper limit may be 95% by weight, 90% by weight, 70% by weight, or 50% by weight, in order to maintain the heat resistance and the thermal stability.

A molecular weight of the polyoxyalkylene-modified polyalkylene terephthalate (component A2) used in one or more embodiments of the present invention is not particularly limited, a molecular weight such that IV, obtained in the same manner as above, may be within a range of 0.3 to 2.0. The lower limit of IV may be 0.4 or more, such as 0.5 or more, in order to maintain the heat resistance or the thermal stability, and the upper limit thereof may be 1.6 or less, such as 1.3 or less, or such as 0.95 or less, in order to exhibit the flowability.

Examples of the polyoxyalkylene-modified polyalkylene terephthalate (component A2) used in one or more embodiments of the present invention may include a block-copolymer having PBT as the hard segment, and a copolymer of polyoxy-1,4-butylene and terephthalic acid having a chain length of 4 or more as the soft segment (for example, IV=1.53); a block-copolymer having PET or PBT as the hard segment, and a polyoxyethylene adduct of 2,2-bis(4-hydroxyphenyl)propane ("bisphenol A") (the chain length of oxyethylene is 2 or more) as the soft segment (for example, IV=0.60), and the like. Of these, polyoxyethylene-modified polyethylene terephthalate containing 60% by weight or more and 85% by weight or less of PET-derived units as the hard segment and 15% by weight or more and 40% by weight or less of units derived from an adduct of polyoxyethylene having a chain length of 8 or more and 20 or less to bisphenol A as the soft segment can be used, because the flowability can be remarkably improved while the heat resistance is maintained.

The method for producing the polyoxyalkylene-modified polyalkylene terephthalate (component A2), which can be used in one or more embodiments of the present invention, may include, but is not limited to, (1) a direct esterification method of the aromatic dicarboxylic acid, the diol, and the modified polyether; (2) a transesterification of the dialkyl ester of an aromatic dicarboxylic acid, the diol, and the modified polyether and/or the ester of the modified polyether; (3) a method in which the modified polyether is added to the dialkyl ester of the aromatic dicarboxylic acid and the diol during the transesterification thereof, or is added to the resulting transesterification mixture, and the mixture is polycondensated; (4) a method in which the aromatic polyester having a high molecular weight is mixed with the modified polyether, and then the mixture is transesterified in a melted state in a reduced pressure, and the like, in the production methods described above, the same polymerization catalyst as used in the polyalkylene terephthalate (component A1). In order to provide the good thermal stability to the resin composition according to one or more embodiments of the present invention, a polymerization catalyst selected from the group consisting of the germanium catalyst, the titanium catalyst, and the aluminum catalyst, such as the germanium catalyst, may be used.

A content of the germanium metal in the polyoxyalkylene-modified polyalkylene terephthalate (component A2) may be 5 ppm or more and 500 ppm or less, such as 10 ppm or more and 400 ppm or less, because when it is kneaded with the highly heat-resistant aromatic polycarbonate (component C) and the aromatic polycarbonate (component B) if necessary, an unexpected transesterification may sometimes occur, thus resulting in the deteriorated physical property and the poor appearance.

A content of the titanium metal in the polyoxyalkylene-modified polyalkylene terephthalate (component A2) may be 5 ppm or more and 100 ppm or less, such as 10 ppm or more and 50 ppm or less, because when it is kneaded with the highly heat-resistant aromatic polycarbonate (component C) and the aromatic polycarbonate (component B) if necessary, an unexpected transesterification may sometimes occur, thus resulting in the deteriorated physical property and the poor appearance.

A content of the aluminum metal in the polyoxyalkylene-modified polyalkylene terephthalate (component A2) may be 5 ppm or more and 100 ppm or less, such as 10 ppm or more and 50 ppm or less, because when it is kneaded with the highly heat-resistant aromatic polycarbonate (component C) and the aromatic polycarbonate (component B) if necessary, an unexpected transesterification may sometimes occur, thus resulting in the deteriorated physical property and the poor appearance.

A content of the antimony metal in the polyoxyalkylene-modified polyalkylene terephthalate (component A2) may be 5 ppm or more and 100 ppm or less, such as 10 ppm or more and 50 ppm or less, because when it is kneaded with the highly heat-resistant aromatic polycarbonate (component C) and the aromatic polycarbonate (component B) if necessary, an unexpected transesterification may sometimes occur, thus resulting in the deteriorated physical property and the poor appearance.

<Aromatic Polycarbonate (Component B)>

In one or more embodiments of the present invention, it is possible to use the aromatic polycarbonate (component B). This is a component which provides toughness to the resin composition, thereby to improve the impact resistance and the mechanical properties. The aromatic polycarbonate (component B) is a resin generally obtained by a reaction of dihydric phenol with phosgene, a reaction of dihydric phenol with a carbonic acid diester, or a reaction of dihydric phenol with a dihaloformate. The aromatic polycarbonate (component B) is selected from aromatic polycarbonates having a solo deflection temperature under load, measured in accordance with ASTM D648 (A method, edgewise) (hereinafter referred to as "DTUL"), of 110° C. or higher and 140° C. or lower, in terms of the balance between the impact resistance and the heat resistance. A polycarbonate containing 2,2-bis(4-hydroxyphenyl)propane ("bisphenol A") as a monomer unit (generally called a "base") may be used. A polycarbonate substantially containing units derived from 2,2-bis(4-hydroxyphenyl)propane and carbonate bonds alone may be used.

Aromatic polycarbonate (component B) having a weight molecular weight, Mw in terms of polystyrene, measured by gel permeation chromatography (GPC) in chloroform, within a range of 20,000 to 200,000 may be used, in view of the impact resistance, the chemical resistance, the molding processability, and the like. In order to improve the impact resistance and the chemical resistance, Mw may be 40,000 or more, such as 45,000 or more, such as 50,000 or more, or such as 55,000 or more. In order to improve the molding processability, Mw may be 150,000 or less, such as 100,000 or less, such as 80,000 or less, or such as 60,000 or less.

<Highly Heat-Resistant Aromatic Polycarbonate (Component C)>

The highly heat-resistant aromatic polycarbonate (component C) used in one or more embodiments of the present invention is a component which provides the heat resistance, capable of standing the baking temperature of the melamine resin coating material, to the resin composition.

In one or more embodiments of the present invention, it may be required for the highly heat-resistant aromatic polycarbonate (component C) to have a DTUL of 145° C. or higher. In order to obtain the better heat resistance, DTUL may be 155° C. or higher, such as 170° C. or higher. In order to easily perform the mold-processing, DTUL may be 250° C. or lower, such as 220° C. or lower, or such as 200° C. or lower.

The weight molecular weight, Mw, measured by GPC as described above, of the highly heat-resistant aromatic polycarbonate (component C) may be within a range of 20,000 to 200,000. In order to improve the impact resistance and the chemical resistance, Mw may be 40,000 or more, such as 50,000 or more, or such as 55,000 or more. In order to improve the molding processability, Mw may be 100,000 or less, such as 80,000 or less, or such as 70,000 or less.

In one or more embodiments of the present invention, as the highly heat-resistant aromatic polycarbonate (component C), a polycarbonate containing at least one monomer unit selected from the group consisting of bis(hydroxyaryl) cycloalkane, bis(hydroxyaryl)fluorene, bis(hydroxyaryl) adamantane, and dihydroxytetraarylmethane may be used. A polycarbonate containing the monomer unit described above in combination with 2,2-bis(4-hydroxyphenyl)propane monomer unit may be used, because the good impact resistance is exhibited.

As the bis(hydroxyaryl)cycloalkane, substituted or unsubstituted bis(hydroxyphenyl)cyclohexanes may be used. Examples thereof may include 1,1-bis(4-hydroxyphenyl) cyclohexane, 1,1-bis(4-hydroxyphenyl)-4-isopropyl cyclohexane, and the like. 1,1-bis-(4-hydroxyphenyl)-3,3,5-trimethylcyclohexane ("bisphenol TMC") can be used. In terms of the balance among the impact resistance, the heat resistance, and the processability, the 1,1-bis-(4-hydroxyphenyl)-3,3,5-trimethylcyclohexane and the 2,2-bis(4-hydroxyphenyl)propane are used, and a molar fraction of the 1,1-bis-(4-hydroxyphenyl)-3,3,5-trimethylcyclohexane monomer units may be adjusted to 10 to 90%. The lower limit thereof may be 30%, or 50%, and the upper limit may be 85%, or 70%.

As the bis(hydroxyaryl)fluorene can be used substituted or unsubstituted bis((hydroxyalkoxy)phenyl)fluorene compounds, bis(hydroxyphenyl)fluorene compounds, and the like. Examples of the bis((hydroxyalkoxy)phenyl)fluorene compound may include a bis(4-(2-hydroxyethoxy)phenyl) fluorene compound, and it is possible to use this compound in combination with a dihydroxybenzene compound and/or a dihydroxynaphthalene compound. The dihydroxybenzene compound can be selected from hydroquinone, resorcinol, and catechol; and as the dihydroxynaphthalene compound, 2,6-naphthalene diol can be specifically selected. As the bis(hydroxyphenyl)fluorene compound, bis(4-hydroxyphenyl)fluorene compounds, particularly 9,9-bis(4-hydroxy-3-methylphenyl)fluorene ("bisphenol BCF"), can be used. For example, in terms of the balance among the impact resistance, the heat resistance, and the processability, 9,9-bis(4-hydroxy-3-methylphenyl)fluorene and 2,2-bis(4-hydroxyphenyl)propane are used and a molar fraction of 9,9-bis(4-hydroxy-3-methylphenyl)fluorene may be adjusted to 10 to 90%. The lower limit thereof may be 25%, 40%, or 60%. The upper limit may be 85%, or 70%. It is possible that 9,9-bis(4-hydroxy-3-methylphenyl)fluorene and α,α'-bis(4-hydroxyphenyl)-m-diisopropyl benzene ("bisphenol M") are used, and a molar fraction of the 9,9-bis(4-hydroxy-3-methylphenyl)fluorene monomer units is adjusted to 10 to 90%.

As the bis(hydroxyaryl)adamantane, substituted or unsubstituted bis(hydroxyphenyl)adamantane may be used. Examples thereof may include 1,3-bis(4-hydroxyphenyl)-5, 7-dimethyl adamantane, and the like. 2,2-bis(4-hydroxyphenyl)adamantane can be used. In terms of the balance among the impact resistance, the heat resistance, and the processability, 2,2-bis(4-hydroxyphenyl)adamantane and 1,1-bis(4-hydroxyphenyl)cyclohexane ("bisphenol Z") are used, and a molar fraction of the 2,2-bis(4-hydroxyphenyl)adamantane monomer units may be adjusted to 10 to 90%. The lower limit thereof may be 30%, or 50%. The upper limit may be more 90%, or 80%. It is possible to use α,ω-bis(hydroxyphenylpropyl)-polydimethylsiloxane and/or 1,1,1-tris(4-hydroxyphenyl)ethane, and the like.

As the dihydroxytetraarylmethane, substituted or unsubstituted dihydroxytetraphenylmethane can be used, and 4,4'-dihydroxytetraphenylmethane ("bisphenol BP") can be used. In terms of the balance among the impact resistance, the heat resistance, and the processability, 4,4'-dihydroxytetraphenylmethane and 2,2-bis(4-hydroxyphenyl)propane and/or α,α'-bis(4-hydroxyphenyl)-m-diisopropyl benzene are used, and a molar fraction of the 4,4'-dihydroxytetraphenylmethane monomer units may be adjusted to 10 to 90%. The lower limit thereof may be 30%, or 45%. The upper limit may be 90%, or 80%.

Of these, aromatic polycarbonates formed of 1,1-bis-(4-hydroxyphenyl)-3,3,5-trimethylcyclohexane and 2,2-bis(4-hydroxyphenyl)propane may be used, because they are industrially easily obtainable.

<Graft-Copolymer (Component D)>

The graft-copolymer (component D) may be a component which improve the impact resistance. In order to sufficiently obtain the effect, the graft-copolymer (component D) contains the rubbery polymer having a glass transition temperature (Tg) of −10° C. or lower, such as −30° C. or lower, or such as −50° C. or lower in a content of 40 to 90% by weight. The content of the rubbery polymer in the graft-copolymer (component D) may be adjusted to 50 to 90% by weight, in order to stably exhibit the impact resistance. The lower limit thereof may be 60% by weight, and upper limit may be 80% by weight. As the rubbery polymer, it is possible to use polybutadiene, hydrogenated polybutadiene, butadiene-styrene copolymers, butadiene-acrylate copolymers, polyorganosiloxane, polyorganosiloxane-acrylate composites, polyorganosiloxane-butadiene composites, and the like. In terms of the impact resistance at a low temperature, the polybutadiene, polyorganosiloxane, polyorganosiloxane-acrylate composites, and polyorganosiloxane-butadiene composites may be used, such as the polybutadiene and polyorganosiloxane.

The graft-copolymer (component D) may be obtained by polymerizing one or more monomers selected from the group consisting of aromatic vinyl compounds, cyanated vinyl compounds and (meth)acrylate compounds in the presence of the rubbery polymer in one or more stages. In order to stably exhibit the impact resistance, the monomer may be a component having methyl methacrylate as a main component. Methyl methacrylate (MMA), and ethyl acrylate (EA), butyl acrylate (BA) or butyl methacrylate (BMA) are used so that a content of MMA in the all monomers excluding the rubbery polymer units may be adjusted to 50% by weight or more, such as 70% by weight or more, such as 80% by weight or more, and may be adjusted to 98% by weight or less, such as 95% by weight or less. For the same reason, it is possible to use a polymer obtained by a polymerization in a gradual manner using MMA and styrene (St). In such a case, they are used so that a content of MMA in the all monomers excluding the rubbery polymer units may be adjusted to 50% by weight or more, such as 70% by weight or more, or such as 80% by weight or more, and may be adjusted to 98% by weight or less, such as 95% by weight or less. For the same reason, it is possible to use a polymer obtained by polymerization in one or more stages using St and acrylonitrile (AN) as the main components. In such a case, they are used so that a content of St in the all monomers excluding the rubbery polymer units may be adjusted to 50% by weight or more, such as 60% by weight or more, such as 70% by weight or more, and may be adjusted to 90% by weight or less, such as 80% by weight or less.

In one or more embodiments of the present invention, as the graft-copolymer (component D), a graft-copolymer in which the rubbery polymer is adjusted to have a volume average particle size of 70 to 250 nm can be used using the production method such as an emulsion polymerization. In order to realize the excellent impact resistance even if the addition amount is small, the lower limit may be 100 nm, or 150 nm, and the upper limit may be 220 nm, or 200 nm.

<Ethylene Copolymer (Component E)>

The ethylene copolymer (component E) used in one or more embodiments of the present invention is a component which improves the flowability during the mold-processing, in addition to the improvement of the impact resistance, as the graft-copolymer (component D) does.

The ethylene copolymer (component E), has a composition containing ethylene and another unsaturated monomer copolymerizable with ethylene as the monomer units. As the unsaturated monomer, it is possible to use a lower alkyl ester of acrylic acid such as ethyl acrylate (EA) or methyl acrylate (MA), propylene, or the like. In order to sufficiently disperse it in the resin composition, whereby the molding failures such as the exfoliation do not occur, copolymers with EA may be used. A ratio of the ethylene to the total amount of the ethylene and the unsaturated monomer may be 10% by weight or more, such as 50% by weight or more, or such as 70% by weight or more, in order to sufficiently realize the impact resistance, and it may be 90% by weight or less, such as 85% by weight or less, or such as 80% by weight or less, in order to avoid the molding failures such as the exfoliation.

In order to improve the impact resistance, a brittle temperature (F 50), measured in accordance with JIS K7216, of the ethylene copolymer (component E) may be adjusted to −30° C. or lower, such as −50° C. or lower, or such as −70° C. or lower. A melting point, measured in accordance with JIS K7121, may be 80° C. or higher, such as 90° C. or higher, in order to easily handle the resin composition during the production, and suppress the stickiness of the molded article. In order to facilitate the molding processability, the melting point may be 130° C. or lower, such as 100° C. or lower. A melt flow rate (MFR), measured in accordance with JIS K7210, of the ethylene copolymer (component E) may be 1 g/10 minutes or more, such as 5 g/10 minutes or more, or such as 10 g/10 minutes or more, in order to improve the flowability during the mold-processing. The upper limit may be 400 g/10 minutes or less, such as 50 g/10 minutes or less, or such as 30 g/10 minutes or less, in order not to impair the heat resistance. As used herein "JIS" is Japanese Industrial Standard.

<Silicate Filler (Component F)>

The silicate filler (component F), used in one or more embodiments of the present invention, is a component which reduces the coefficient of linear thermal expansion of the molded article obtained from the resin composition. The silicate filler (component F) is an alkaline inorganic substance containing silica or alumina as a main component. In one or more embodiments of the present invention, at least one member selected from mica and kaolin is used. Examples of the shape of the silicate filler (component F) may include a flat plate shape, a filamentous shape, scaly shape, and the like. Of these, the flat plate shape and scaly shape may be used, because the coefficient of linear thermal expansion is easily reduced, and the anisotropy can be suppressed. As the silicate filler (component F), it is possible to use silicate fillers whose volume average particle size (MV), measured by a laser diffraction method, of 0.5 to 45 µm. Silicate fillers having a ratio of the MV to the thickness, i.e., an aspect ratio, of 5 to 200 can also be used. In order to reduce the coefficient of linear thermal expansion, thereby to improve the heat resistance, MV may be 1 µm or more, such as 2 µm or more, such as 5 µm or more, or such as 15 µm or more. In order not to remarkably worsen the impact resistance, MV may be 45 µm or less, such as 35 µm or less, or such as 25 µm or less. In order to improve the balance among the reduction effect of the coefficient of linear expansion, the heat resistance, and the impact resistance, the aspect ratio may be 10 or more, or such as 50 or more, and 150 or less, such as 100 or less, or such as 80 or less. Mica may be used in terms of the balance between the reduction effect of the coefficient of linear expansion and the impact resistance.

When the mineral filler is brought into contact with the aromatic polycarbonate (component B) and the highly heat-resistant aromatic polycarbonate (component C) in the resin composition under a high temperature circumstance during the compound production or the mold-processing, it may sometimes act as a decomposition catalyst to the components. If the decomposition violently occurs, carbonic acid gas is generated, which may sometimes cause the poor appearance such as silver streak during the mold-processing. In order to inhibit such a decomposition, it is possible that alkaline earth metals are not substantially contained in the silicate filler (component F) as the forming element. Examples of the alkaline earth metal may include calcium, magnesium, barium, and the like. From this situation, in one or more embodiments of the present invention, as the silicate filler (component F), white mica and silk mica may be used, such as the white mica. Here, the term "substantially contain" refers that the alkaline earth metal element is contained in a content of more than 5% by weight in the filler.

The silicate filler (component F) may be produced by dispersing silicate in water after mining, during pulverization, or after pulverization, and then separating an aqueous phase by means of a wet vibrating sieve method, sedimentation, wet cyclone method, filtration or centrifugation; and drying the resulting product. The reason in which the method described above is adopted is that impurity components contained in the silicate filler may have sometimes an effect as the decomposition catalyst to the aromatic polycarbonate (component B) or the highly heat-resistant aromatic polycarbonate (component C) as described above. It may be possible to remove the impurity components from the silicate filler (component F) by the treatment of the filler using water as described above. The silica filler produced in a manner in which the wet pulverization method using water is employed when it is pulverized may be used, because the acquisition of a fine powder having a high aspect ratio can be realized, and the mechanical properties such as the impact resistance and the reduction effect of the coefficient of linear expansion can be easily well-balanced. As the wet pulverization method, a wet ball mill method, a wet roller mill method, a wet micron mill method, a hydraulic jet pulverization method, or a wet grinding using a stone mill may be employed.

It is possible to use the silicate filler (component F), which has been surface-treated with a silane coupling agent, a titanium coupling agent, an aluminum coupling agent, or the like.

<Electric Conductive Filler (Component G)>

In one or more embodiments of the present invention, the electric conductive filler (component G) can be used in order to be able to perform the electrostatic coating without using an electric conductive primer. As the electric conductive filler (component G), it is possible to use a carbon, metal or semiconductive electric conductive filler. In order to make the resulting product light and to provide the sufficient electric conductivity capable of coping with the electrostatic coating, it may be possible to use the carbon electric conductive filler. The carbon electric conductive filler may include single wall carbon nanotube (SWCNT), multiwall carbon nanotube (MWCNT), Ketjen black, graphite, graphene, carbon fiber, and the like. From the perspective that the electric conductivity can be provided even in a quite small amount, the mechanical properties are only slightly reduced, and the good surface appearance of the molded article is obtained, it is possible to use SWCNT having an aspect ratio of 50 or more, such as 100 or more, such as 200 or more, or such as 500 or more; an average diameter of 0.5 nm or more, such as 0.8 nm or more, such as 2 nm or less, or such as 1.5 nm or less; and an average fiber length of 0.1 µm or more, such as 0.5 µm or more, such as 1 µm or more, or such as 5 µm or more and 500 µm or less, such as 100 µm or less, or such as 50 µm or less. From the perspective that the electric conductivity can be provided in a small amount, it can be inexpensively supplied, the mechanical properties are only slightly reduced, and the good surface appearance of the molded article is obtained, it is possible to use MWCNT having an average diameter of 2 nm or more, such as 5 nm or more and 80 nm or less, such as 50 nm or less, or such as 15 nm or less; an average fiber length of 0.1 µm or more, such as 0.5 µm or more, or such as 1 µm or more and 100 µm or less, such as 20 µm or less, or such as 5 µm or less; and a specific surface area of 100 m$^2$/g or more, such as 200 m$^2$/g or more, such as 250 m$^2$/g or more and 500 m$^2$/g or less, such as 300 m$^2$/g or less. From the perspective that the electric conductivity can be provided, it can be inexpensively supplied, and the improved impact resistance can be expected, it is possible to use carbon fiber having a diameter of 1 µm or more, such as 5 µm or more and 20 µm or less, such as 9 µm or less; and a fiber length of 2 mm or more, such as 5 mm or more, such as 10 mm or more, or such as 20 mm or more and 50 mm or less, such as 40 mm or less. It is possible to use the carbon fiber obtained from polyacrylonitrile (PAN) as a starting material (PAN carbon fiber), and the carbon fiber obtained from petroleum pitch or coal pitch as a starting material (pitch carbon fiber). The PAN carbon fiber may be used because the good mechanical properties can be obtained. As a sizing material for the carbon fiber, it is possible to use an epoxy-vinyl ester resin, an epoxy-polyester resin, polyamide, urethane, or the like. The epoxy-vinyl ester resin and epoxy-polyester resin may be used.

Thus, in order to perform the electrostatic coating, a volume resistivity of the molded article, obtained from the resin composition according to one or more embodiments of the present invention, can be adjusted to $10^8$ Ωm or less, such as $10^6$ Ωm or less.

When the graphite having an average dispersion particle size of 20 µm or more, such as 50 µm or more may be used, the thermal conductivity can also be provided in addition to the electric conductivity.

<Electrostatic Primer>

When the electric conductive filler (component G) is not used, or the electric conductivity is insufficient even if the component G is used, an electrostatic primer may be used when the electrostatic coating is performed in terms of the safety. As the electrostatic primer, for example, a primer may be used in which an electric conductor such as an electric conductive carbon black, graphite, silver, nickel, or copper is diluted, together with, for example, an active methylene block polyisocyanate/chlorinated polyolefin resin, with an organic solvent, for example, a hydrocarbon solvent such as xylene, toluene, or cyclohexane, an alcohol solvent such as methyl alcohol, or isopropyl alcohol, a ketone solvent such as methyl isobutyl ketone, methyl ethyl ketone, cyclohexane, or isophorone, an ester solvent such as ethyl acetate, butyl acetate or ethyleneglycol monoethyl ether acetate, or a mixed solvent thereof.

<Amorphous Thermoplastic Resin (Component L)>

The resin composition of one or more embodiments of the present invention may contain the amorphous thermoplastic resin (component L) other than the polycarbonate resin in an amount of 0.5 to 15 parts by weight.

The amorphous thermoplastic resin (component L) is not limited, and in order to inhibit the thermal deformation during the baking of the coating layer, a highly heat-resistant amorphous thermoplastic resin incompatible with the aromatic polyester resin (component A), the aromatic polycarbonate resin (component B), and the highly heat-resistant aromatic polycarbonate resin (component C).

With respect to an amount of the amorphous thermoplastic resin used, the lower limit may be 0.5 parts by weight, based on 100 parts by weight of the total amount of the resin composition, 1 part by weight, or 2.5 parts by weight, in order to increase the effect of inhibiting the thermal deformation. The upper limit may be 15 parts by weight, 10 parts by weight, or 7.5 parts by weight, in terms of the moldability.

The amorphous thermoplastic resin (component L) in one or more embodiments of the present invention may include resins having a glass transition temperature of 110° C. or higher. For example, when at least one amorphous thermoplastic resin selected from the group consisting of a polyether imide resin, a polyphenylene ether resin, polysulfone resins such as polysulfone polyphenyl sulfone, and polyether sulfone, and polyarylate resins is added, the heat decomposition resistance and the heat resistance can be improved. It is also possible to use a mixture such as a polymer alloy or polymer blend with another polymer. Of these, the polyphenylene ether resin and the polyarylate resin may be used, such as the polyphenylene ether resin, in terms of the heat decomposition resistance and the flowability.

The amorphous thermoplastic resin (component L) in one or more embodiments of the present invention may be incompatible with the aromatic polyester resin (component A), the aromatic polycarbonate resin (component B), and the highly heat-resistant aromatic polycarbonate resin (component C), in terms of the heat decomposition resistance.

The incompatibility and compatibility, in one or more embodiments of the present invention, is evaluated from a glass transition temperature obtained from a resin composition of two kinds of polymer components α and γ kneaded in a weight ratio of the component α:component γ=1:1 by using a differential scanning calorimetry (DSC) at an elevation speed of 10° C./minute.

The incompatibility is characterized in that a glass transition temperature (α-Tg) of the component α in the resin composition and a glass transition temperature (γ-Tg) of the component γ are both located within a range of ±20° C., such as within a range of 15° C., from that of each component before the kneading.

The compatibility is characterized in that (α-Tg) and (γ-Tg) are not observed in the resin composition after the kneading, and a different single glass transition temperature is observed, or (α-Tg) or (γ-Tg) in the resin composition after the kneading does not satisfy the evaluation condition of the compatibility described above.

When there are three kinds of polymer components α', β', and γ, and the compatibility of the component γ to the component α' and the component β' is discussed, if a resin composition containing the kneaded component α' and the kneaded component β' has a single glass transition temperature, then the resin composition containing the kneaded component α' and the kneaded component β' is assumed to be a single polymer component α, and the glass transition temperature thereof is assumed to be (α-Tg). In the resin composition containing the component α' and the component β', when the glass transition temperature of the component α' and the glass transition temperature of the component β' are separately observed, the evaluation of the compatibility of the combination of the component α' and the component γ is separately performed from the evaluation of the compatibility of the combination of the component β' and the component γ.

In one or more embodiments of the present invention, the incompatibility and the compatibility between the amorphous thermoplastic resin (component L) and the aromatic polyester resin (component A) can be evaluated by applying the aromatic polyester resin (component A) to the component α, applying the amorphous thermoplastic resin (component L) to the component γ, and using the evaluation method described above. The incompatibility and the compatibility among the amorphous thermoplastic resin (component L), the aromatic polycarbonate resin (component B), and the highly heat-resistant aromatic polycarbonate resin (component C) can be evaluated by applying the aromatic polycarbonate resin (component B) to the component α', applying the highly heat-resistant aromatic polycarbonate resin (component C) to the component β', applying the amorphous thermoplastic resin (component L) to the component γ, and using the evaluation method described above, because the incompatibility and the compatibility between the component B and the component C vary depending on the selection of a composition.

The polyether imide resin, in one or more embodiments of the present invention, is a polymer containing repeating units of aliphatic, alicyclic or aromatic ether units and a cyclic imide group, which is not particularly limited so long as the polymer has melt-moldability. The polyether imide resin may contain, in the main chain thereof, structural units other than the cyclic imide and the ether bonds, such as aromatic, aliphatic, alicyclic ester units, oxycarbonyl units.

The polyphenylene ether resin is a homopolymer or copolymer having a structural unit represented by the following general formula (10);

[Chem. 10]

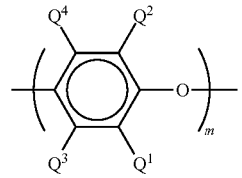

(Formula 10)

(wherein $Q^1$ and $Q^2$ represent each a primary or secondary alkyl group, aryl group or amino group; $Q^3$ and $Q^4$ represent each a hydrogen atom, or a primary or secondary alkyl group, aryl group, aminoalkyl group or hydrocarbonoxy group; and m is an integer of 10 or more.)

The primary alkyl group, represented by $Q^1$ to $Q^4$ is methyl, ethyl, n-propyl, n-butyl, n-amyl, isoamyl, 2-methylbutyl, n-hexyl, 2,3-dimethyl butyl, 2, 3- or 4-methylpentyl, or heptyl group. Examples of the secondary alkyl group may include isopropyl, sec-butyl, or 1-ethylpropyl. The homopolymer of the polyphenylene ether resin may include, for example, homopolymers containing 2,6-dimethyl-1,4-phenylene ether units. The copolymer may be a random copolymer containing a combination of the structural units represented by the general formula described above and 2,3,6-trimethyl-1,4-phenylene ether units.

The polyphenylene ether resin having an intrinsic viscosity, measured at 30° C. in chloroform, of 0.2 to 0.8 dl/g, such as 0.25 to 0.7 dl/g, or such as 0.3 to 0.6 dl/g, may be used. The polyphenylene ether resin having the intrinsic viscosity less than 0.2 dl/g is not preferable, since such a resin has difficulty to be industrially produced, and the impact resistance of the resin composition becomes insufficient. When it is more than 0.8 dl/g, the gel component is increased, and the appearance of the molded article, formed from the resin composition is worsened. In order to decrease an apparent viscosity of the polyphenylene ether resin, it is possible to contain a styrene resin compatible with the polyphenylene ether resin in a content of at most 35% by weight to the polyphenylene ether resin. The styrene resin herein may include polystyrene, styrene butadiene-copolymers, and the like. When the styrene resin is contained in a content of more than 35% by weight, the heat resistance is undesirably reduced compared to the polyphenylene ether. The content of the styrene resin may be 20% by weight or less, such as 10% by weight or less, or such as 0% by weight.

The polysulfone resin, in one or more embodiments of the present invention, is a thermoplastic resin having aromatic groups and sulfone groups as a linking group thereof in the main chain, and is generally roughly divided into polysulfone, polyether sulfone, and polyphenyl sulfone.

The polyarylate resin, in one or more embodiments of the present invention, is a resin having an aromatic dicarboxylic acid and a bisphenol as the repeating units.

Examples of the bisphenol may specifically include 2,2-bis(4-hydroxyphenyl)propane, 2,2-bis(4-hydroxy-3,5-dimethylphenyl)propane, 2,2-bis(4-hydroxy-3,5-dibromophenyl)propane, 2,2-bis(4-hydroxy-3,5-dichlorophenyl)propane, 4,4'-dihydroxydiphenyl sulfone, 4,4'-dihydroxydiphenyl ether, 4,4'-dihydroxydiphenyl sulfide, 4,4'-dihydroxydiphenyl ketone, 4,4'-dihydroxydiphenylmethane, 1,1-bis(4-hydroxyphenyl)cyclohexane, and the like. These compounds may be used alone or as a mixture of two or more kinds. 2,2-bis(4-hydroxyphenyl)propane may be used in terms of the economy.

Examples of the aromatic dicarboxylic acid may specifically include terephthalic acid, isophthalic acid, orthophtalic acid, 1,5-naphthalene dicarboxylic acid, 2,6-naphthalene dicarboxylic acid, diphenic acid, 4,4'-dicarboxydiphenyl ether, bis(p-carboxyphenyl)alkane, 4,4'-dicarboxydiphenyl sulfone, and the like. Of these, terephthalic acid and isophthalic acid may be used.

<Additive>

The resin composition according to one or more embodiments of the present invention may contain, if necessary, a known light stabilizer, flame retardant, plasticizer, lubricant, releasing agent, ultraviolet absorber, antistatic agent, pigment, dye, inorganic filler, long fiber filler, pH-controlling agent, flowability improver, acrylonitrile-styrene copolymer resin (AS), or the like. As the known light stabilizer, it is possible to use a benzophenone compound, a triazine compound, benzotriazole compound, or the like. As the known releasing agent, it is possible to use stearyl stearate, pentaerythritol tetrastearate, montanoic acid esters, diglycerine stearate, glycerine monobehenate, or the like. Of these releasing agents, pentaerythritol tetrastearate, and montanoic acid esters may be used, because the poor appearance, caused by the gas generation during the mold-processing, can be inhibited. For the same reason, releasing agents having an acid value of 20 or less may be used, such as 12 or less, or such as 4 or less.

In one or more embodiments of the present invention, it is possible to use long fiber pellets, which are obtained in a manner in which a continuous fiber such as glass fiber, carbon fiber, stainless steel fiber or aramid fiber, such as an opened continuous fiber bundle, is melt-impregnated with the resin composition in an impregnation die or extrusion machine, and then the resulting mixture is formed into pellets, whereby the fiber described above is incorporated into the resin composition. Because of these, the fiber length is substantially the same as the length of the pellet, and thus the resin composition having the excellent impact resistance may be used obtained. Stainless steel fiber may be used, because an electromagnetic shielding effect may also be excellent. Here, in the production of the long fiber pellets, a method in which a resin composition is melted and kneaded in an extruder; the obtained resin composition in a melted state is supplied to an impregnation die through which one or more fiber bundles are pierced; the opening of the fibers and impregnation with the resin composition are advanced in the impregnation die; the fiber bundles impregnated with the resin composition are continuously drawn in, and the fiber bundles are subjected to a pelletizing process is referred to as a "pultrusion method. A method in which the resin composition is melted and kneaded in the extruder as described above; then one or more fiber bundles are introduced into the extruder from a bent part located in the middle of the extruder; the opening of the fibers and the impregnation with the resin composition are advanced in the extruder; the mixture is discharged through the die to form a strand, and then it is subjected to the pelletizing process is referred to as a "direct roving method." The pultrusion method may be used, because the fiber length can be easily maintained, and the reduction of the physical properties is small. On the other hand, when a fiber whose physical damage is slight in the extruder, such as carbon fiber, is used, the direct roving method can be used.

<Production method of Resin Composition>

The resin composition according to one or more embodiments of the present invention may be produced in any method. For example, the composition is produced by mixing using a blender, a super mixer, or the like, or kneading using a single or multi-screw extruder.

<Molding Method of Resin Composition>

The resin composition according to one or more embodiments of the present invention may be molded in any method. For example, the resin composition can be molded by injection molding, extrusion molding, blow molding, compression molding, or the like. The injection molding may be used because a molded article having a complicated shape such as a rib or clip seat can be efficiently produced. In order to obtain a large-sized molded article having the good appearance, injection molding using a hot runner die may be used.

<Molded Article>

The molded article one or more embodiments of the present invention can be obtained by applying the molding method described above to the resin composition. When the molded article of one or more embodiments of the present invention is used as an outer panel member of an automobile or a part of it, it is possible adjust the projected area of the molded article to 40,000 $mm^2$ or more and an average thickness to 5 mm or less. In order to reduce the weight of vehicle by increasing a substitution area for a metal, the projected area may be 60,000 $mm^2$ or more, such as 100,000 $mm^2$ or more. In order to reduce the weight of the member itself, the average thickness may be 3.5 mm or less, such as 3 mm or less, such as 2.5 mm or less, or such as 2 mm or less. In order not to excessively reduce the product rigidity, the average thickness is 1 mm or more, such as 1.5 mm or more. The thickness herein is an average thickness of a top panel of the molded article. In order to further secure the product rigidity, it is possible to provide a rib structure to a back surface of the molded article. In order to inhibit skin marks generated on a design surface of the top plate, it may be possible to adjust the thickness of the rib to ½ or less of the thickness of the top plate, such as 1/2.5 or less of the thickness of the top plate. On the other hand, in order to prevent short shots on the rib part, the thickness may be adjusted to 0.3 mm or more, such as 0.5 mm or more, such as 0.6 mm or more. As used herein, the "skin mark" refers to a depression generated on the design surface, which is unintentionally generated in a design planning, caused by the volume shrinkage accompanied with cooled resin.

As the projected area and the thickness, in general, set values, which are set on structural design of the molded article by using CAD (computer-assisted design), can be used. When the set values are unknown, the structure of the molded article is converted into numerals by using 3D scanning, and analysis can be performed using CAD or CAE (computer-assisted engineering) software, based on the obtained data.

<Multi-Layer Composite>

When the molded article according to one or more embodiments of the present invention is used as the exterior or outer panel member of the automobile, it can be used alone, but in order to improve the appearance, a multi-layer composite can be used in which the molded article is laminated with one or more layers of cured acid-epoxy resins such as a cured polyester melamine resin, a cured alkyd melamine resin, a cured acrylic melamine resin, a cured epoxyester resin, a cured acrylic urethane resin, a cured expoxymelamine resin, and a cured acrylic acid resin containing epoxy group. When the molded article is assembled to an automobile body made of iron, aluminum or aluminum alloy to which an electrodeposition coating such as zinc phosphate is applied, or made of resin such as an epoxy resin-carbon fiber composite; then the resulting product is coated with a coating material containing a curable resin composition, which is a precursor of the cured resin, by spray-coating, electrostatic coating, or the like; and the coated product is passed through a baking furnace, whereby the cured resin is formed on the molded article, the cured polyester melamine resin, the cured alkyd melamine resin, the cured acrylic melamine resin, the cured acid epoxy resin, and the cured acrylic urethane resin can be selected among the cured resins described above. The cured polyester melamine resin, the cured alkyd melamine resin, and the cured acrylic melamine resin can be selected, because they can be handled in the state of an aqueous coating material, and volatile organic compounds can be reduced. In addition, the cured polyester melamine resin can be selected in terms of the chipping resistance and the weatherability. The aqueous coating material can be handled in the state of an aqueous dispersion, such as an emulsion, containing a curable resin composition, which is the precursor of the cured resin described above. The aqueous coating material may include a combination of a dispersion-type polyester resin and a melamine resin having a low molecular weight, and the like. In terms of the resistance to acid rain, the cured epoxyester resin, and the cured epoxy group-containing acrylic resin-carboxylic anhydride-containing acrylic resin may be used, though they are solvent coating materials. They may be used as a mixture of multiple kinds, regardless of the kind of the aqueous coating material and the solvent coating material.

In the multi-layer composited molded article, in order to provide the durability to the coating layer formed from the cured resin, a solution or dispersion containing the curable resin composition capable of forming the cured resin is coated as the coating material, and then the baking is performed in the baking furnace having a high temperature, in which the curing reaction is sufficiently advanced. When the product is passed through the baking furnace, the baking temperature may be adjusted to 60° C. to 170° C. When the cured polyester melamine resin, the cured alkyd melamine resin, the cured acrylic melamine resin, the cured epoxyester resin, or the cured epoxy group-containing acrylic resin-carboxylic anhydride-containing acrylic resin is used, it may be possible to adjust the minimum baking temperature to 120° C., such as 130° C., in order to sufficiently increase the hardness of the cured resin. From the concern for the environment, in order to reduce the energy used, it may be possible to adjust the maximum baking temperature to 160° C., such as 150° C. The baking may be performed every time after the coating of the coating material containing the curable resin composition, which is the precursor of the cured resin. On the other hand, in terms of the process efficiency and the reduced energy consumption, it is possible that the coating material is coated in multi stages, pre-drying is performed at a temperature of about 80° C., the product is passed through baking furnace, and the resin is cured at once.

An example in which a curable resin composition capable of forming the cured polyester melamine resin is used as the base coating, and the cured acrylic melamine resin and/or the cured epoxy group-containing acrylic resin-carboxylic anhydride-containing acrylic resin may be used as the top coat.

Thus, the resin composition according to one or more embodiments of the present invention can be formed into a large-sized molded article having a thin wall thickness, because of the excellent flowability. The molded article obtained from the resin composition has the excellent heat resistance, and thus even if the molded article undergoes the baking process in which it is exposed to a high temperature in the coating process, the deformation does not excessively occur, and the good surface appearance can be maintained after the coating. For that reason, it is possible that the molded article is assembled to the metal automobile body, if necessary, and the in-line coating is performed, or the coating of only the molded article is performed offline, separately from the automobile body, and the resulting product can be processed as the multi-layer composite with the cured resin. The thus obtained composite molded article has the reduced coefficient of linear thermal expansion, the excellent mechanical properties such as the impact resistance, and the excellent appearance, and thus it can be used as the exterior or outer panel member for an automobile. In the automobile exterior or outer panel member of one or more embodiments of the present invention, even if the cured resin, which is formed on the surface layer as the coating layer, is damaged by stones flying, the member is not rusted, and has the excellent durability. In addition, the member has a specific gravity lower than that of a metal, and thus it can contribute to the weight reduction of the automobile, and is the excellent member considering the environment.

EXAMPLES

Examples which further explain one or more embodiments of the present invention are described below, but the present invention is not limited thereto.

"Parts" and "%" in the following measurement conditions and Examples described below are respectively "parts by weight" and "% by weight."

First, materials used and measurement methods are described below.

<Materials Used>

(Component A) Aromatic Polyester
(Component A1) Polyalkylene Terephthalate
A1-1: Polyethylene terephthalate resin (PET) "EFG-70" manufactured by Bell Polyester Products, Inc., IV value: 0.70. The product is PET produced using a germanium (Ge) catalyst. A Ge concentration is from 25 to 35 ppm in the component A1-1.
A1-2: PET "TRN-8550 FF" manufactured by Teijin Limited, IV value: 0.75. The product is PET produced using a phosphorus-titanium catalyst. A Ti concentration is from 10 to 15 ppm in the component A1-2.
A1-3: PET "NOVAPEX® PBK 2" manufactured by Mitsubishi Chemical Corporation, IV value: 0.63. The product is PET produced using an antimony (Sb) catalyst. A Sb concentration is 100 ppm in the component A1-3.
(Component A2) Polyoxyalkylene-Modified Polyalkylene Terephthalate
A2-1: A polyoxyalkylene-modified polyalkylene terephthalate (component A2), produced in a method of Production Example 1 described below, IV value: 0.59. A Ge concentration is from 250 to 300 ppm in the component A2-1.

A2-2: A polyoxybutylene-modified polybutylene terephthalate "Hytrel® 5557" manufactured by Du Pont-Toray Co., Ltd., MFR: 8 g/10 minutes (230° C., 2.16 kg).
(Component B) Aromatic Polycarbonate
B-1: A bisphenol A polycarbonate "Tafron® A2200" manufactured by Idemitsu Kosan Co., Ltd., GPC molecular weight: 49,700, DTUL: 137° C.
B-2: A bisphenol A polycarbonate "Tafron® A2500" manufactured by Idemitsu Kosan Co., Ltd., GPC molecular weight: 59,500, DTUL: 138° C.
B-3: A bisphenol A polycarbonate "Iupilon® H3000" manufactured by Mitsubishi Engineering-Plastic Corporation, GPC molecular weight: 41,100, DTUL: 132° C.
(Component C) Highly Heat-Resistant Aromatic Polycarbonate
C-1: A bisphenol A-bisphenol TMC copolymer polycarbonate "Apec® 2097" manufactured by Bayer Material Science AG, GPC weight average molecular weight in the term of polystyrene: 58,400, DTUL: 172° C.
(Component D) Graft-Copolymer
D-1: A butadiene graft-copolymer "Kaneace® M-711" manufactured by Kaneka Corporation.
D-2: A butadiene graft-copolymer "Kaneace® M-732" manufactured by Kaneka Corporation.
D-3: An acrylic graft-copolymer "Kaneace® FM-50" manufactured by Kaneka Corporation.
D-4: A silicone graft-copolymer "Kaneace® MR-02" manufactured by Kaneka Corporation.
D-5: A butadiene graft-copolymer "Kaneace® M-731" manufactured by Kaneka Corporation.

All of the graft-copolymers D-1 to D-5 contained 40 to 90% by weight of a rubbery polymer having a Tg of −10° C. or lower.
(Component E) Ethylene Copolymer
E-1: An ethylene/ethyl acrylate copolymer "NUC-6570" manufactured by NUC Corporation, Ethyl acrylate content: 25%, Density: 0.94, Brittle temperature: <−75° C.
(Component F) Silicate Filler
F-1: A wet-pulverized product of natural white mica "A-21S" manufactured by Yamaguchi Mica Co., Ltd., Volume average particle size: 22 μm, Aspect ratio: 70.
F-2: A wet/dry-pulverized product of natural white mica "SJ-005" manufactured by Yamaguchi Mica Co., Ltd., Volume average particle size: 5 μm, Aspect ratio: unknown.
F-3: A wet-pulverized product of natural white mica "A-11" manufactured by Yamaguchi Mica Co., Ltd., Volume average particle size: 3 μm, Aspect ratio: unknown.
F-4: A wet-pulverized product of natural white mica "A-41S" manufactured by Yamaguchi Mica Co., Ltd., Volume average particle size: 47 μm, Aspect ratio: 80.
F-5: A wet-pulverized product of natural silk mica, manufactured by FIMATEC Ltd., Volume average particle size: 20 μm, Aspect ratio: unknown.
F-6: A surface-treated, baked kaolin "Translink 77" manufactured by Hayashi Kasei Co., Ltd., Volume average particle size: 0.8 μm, Oil absorption: from 80 to 90 ml/100 g, Specific gravity: 2.63.
F-7: A general high bulk density talc "MS-KY" manufactured by Nippon Talc Co., Ltd., Volume average particle size: 23 μm, Oil absorption: 21 ml/100 g, Specific surface area: 2.5 m²/g.
(Component G) Electric Conductive Filler
G-1: A multilayered carbon nanotube (MWCNT) "NANOCYL NC7000" manufactured by NANOCYL S.A., Average diameter: 9.5 nm, Average length: 1.5 μm. In Examples, a masterbatch of 15% by weight of NC7000 and 85% by weight of the product corresponding to the component B-1 was used as a starting material, but effective amounts of the component B-1 and component G-1 were described in Table 1.
G-2: A PAN carbon fiber chopped fiber "HT-C422 6 mm" manufactured by Toho Tenax Co., Ltd., a product treated with a urethane sizing agent.
(Component H) Phosphorus Compound
H-1: A mixture of acidic phosphoric acid monostearyl ester and acidic phosphoric acid distearyl ester "Adekastab® AX-71" manufactured by ADEKA Corporation.
(Component J) Other Blend Component
(Component J1) Antioxidant
J1-1: A phenol antioxidant "Adekastab® AO-60" manufactured by ADEKA Corporation.
J1-2: A phosphorus antioxidant "Adekastab® PEP-36" manufactured by ADEKA Corporation.
J1-3: A phosphorus antioxidant "Irgafos® 126" manufactured by BASF Corporation.
(Component J2) Releasing Agent
J2-1: A specific fatty acid ester releasing agent "Rikester® EW-400" manufactured by Riken Vitamin Co., Ltd., Maximum acid value: 15.
J2-2: A specific fatty acid ester releasing agent "Rikester® EW-440A" manufactured by Riken Vitamin Co., Ltd., Maximum acid value: 3.
(Component J3) Epoxy Thermal Stabilizer
J3-1: An epoxy compound "Adekacizer® EP-22" manufactured by ADEKA Corporation.
(Component J4) Pigment
J4-1: A carbon black masterbatch (diluted with low molecular weight polystyrene) "Black SHPA-865" manufactured by Sumika Color Co., Ltd.
(Component K) Continuous Fiber
(Component K1) Glass Continuous Fiber K1-1: A glass continuous fiber bundle "T439N" manufactured by Nippon Electric Glass Co., Ltd. The continuous fiber is supplied in a roving state.
(Component L)
Amorphous Thermoplastic Resin
L-1: A polyphenylene ether resin "PX-200" manufactured by Mitsubishi Engineering-Plastics Corporation.
<Measurement Method>
(Intrinsic Viscosity (IV Value))

A solution containing an aromatic polyester (component A) in a concentration of 0.5 g/dl was prepared using a mixed solvent of tetrachloroethane/phenol=50/50 (weight ratio), and an IV value was calculated from a logarithmic viscosity obtained in a measurement at 25° C.
(GPC Molecular Weight)

A chloroform solution containing a polymer in an amount of about 20 mg/10 ml was prepared, and the resulting solution was subjected to a gel permeation chromatography (GPC) analysis, thereby determining a weight average molecular weight (Mw). In the GPC analysis, a GPC system (manufactured by Waters Corporation) was used, and polystyrene gel columns "Shodex K-806" and "Shodex K805" (manufactured by Showa Denko K. K.) were used as a column. The development was performed at 30° C. using chloroform as an effluent, and the analysis was performed in the term of polystyrene.
(Melt Flow Rate (MFR))

MFR was measured at 280° C. with a load of 21.18 N in accordance with ISO 1133. In the measurement, pellets dried at 110° C. for 5 hours or more were used.
(Spiral Flow Length (SFL))

Using an injection molding machine "FAS-150B" (manufactured by FANUC Corporation), molding was performed using a spiral die having a thickness of 2 mm at a cylinder temperature of 300° C. and a die temperature of 80° C., whereby a flow length was evaluated. In the measurement, pellets dried at 110° C. for 5 hours or more were used.

(Deflection Temperature Under Load (DTUL))

Measurement was performed according to an A method (with a load of 1.80 MPa) and a B method (with a load of 0.45 MPa) based on ASTM D648 with edgewise.

(Heat Sag)

A molded article having a length of 125 mm×a width of 12 mm×a thickness of 3.2 mm was evaluated at 140° C. or 160° C. with an overhang amount of 100 mm in accordance with JIS K 7195.

(Surface Appearance)

Using an injection molding machine "FN-1000" (manufactured by Nissei Plastic Industrial Co., Ltd.), a flat molded article having sizes of 120 mm×120 mm×3 mm was molded at a cylinder temperature of 280° C. and a die temperature of 80° C. for a residence time of 2 minutes. An appearance of the molded article was observed visually, and evaluations were made according to the following criteria:

⊚: Flashes or roughening were not totally observed on the surface.

O: Flashes or roughening were observed on the surface in 10% or less of the total area.

Δ: Flashes or roughening were observed on the surface in more than 10% and 25% or less of the total area.

X: Flashes or roughening were observed on the surface in more than 25% of the total area.

(Coefficient of Linear Expansion)

Coefficients of linear expansion in a flowing direction of a resin (MD) and a direction orthogonal to the flowing direction of the resin (TD) were measured at a temperature range of −30 to 80° C. by a thermomechanical analysis (TMA) in accordance with ISO 11359: 1999 (E). A test piece had sizes of 7 mm×4 mm×a thickness of 4 mm. At that time, test pieces were opposed so that a length in a testing direction (MD or TD) was 7 mm and cut.

(Tensile Test)

A yield strength, a breaking strength, and a breaking elongation of a type A1 dumbbell, prescribed in ISO 20753, were measured at a test speed of 10 mm/minute and at 23° C. in accordance with ISO 527-1,2.

(Bending Test)

A bending strength and a flexural modulus were measured at a test speed of 5 mm/minute at 23° C. in accordance with ISO 178.

(Impact Resistance Test)

An Izod strength of a test piece having a thickness of 3.2 mm was measured at 23° C. or −30° C. in accordance with ISO 180.

(Surface Impact Strength)

The maximum nondestructive height was obtained at 23° C. or −30° C. with a falling weight of 2.5 kg in accordance with ASTM D2794 (for plastics), and the obtained value was converted into an energy value using a formula: a gravitational acceleration (9.807 m/s$^2$)×a weight of the falling weight×the maximum nondestructive height.

(Volume Resistivity)

A volume resistivity of a molded article having size of 100 mm×100 mm×3 mm was measured at 23° C. in accordance with JIS K6911. In the measurement, the measured values varied among the molded articles, and thus the results were treated as an index number of an average value obtained by measuring 5 samples.

(Specific Gravity)

A specific gravity was obtained in an immersion method in accordance with ISO 1183-1.

(Production Example 1) Production of Polyoxyalkylene-Modified Polyalkylene Terephthalate (A2-1)

In a reactor equipped with a stirrer, a nitrogen line, a vacuum line, and a gas outlet were put 80 parts by weight of bishydroxyethylene terephthalate (BHET) which was starting materials of a polyethylene terephthalate, and 20 parts by weight of a polyoxyethylene diadduct of bisphenol A (an average chain length of an oxyethylene units was 15) "Bisol 30 EN" (manufactured by TOHO Chemical Co., Ltd.). After a gas phase part was substituted by nitrogen, 300 ppm of germanium dioxide, and 3000 ppm of a phenol antioxidant "Irganox® 1010" (manufactured by BASF Japan Ltd.) were added based on a theoretical yield of a polyoxyalkylene-modified polyalkylene terephthalate. After the mixture was maintained at 190° C. for 2 hours, the temperature was gradually elevated and simultaneously the pressure was gradually reduced through a vacuum pomp. Finally, the polycondensation was performed at 280° C. in 1 Torr, and the reduction of the pressure was stopped when a stirring power reached a pre-determined value to stop the reaction. The obtained polyoxyalkylene-modified polyalkylene terephthalate (A2-1) was drawn out from the bottom part of the reactor, then it was cooled in a water tank to form into a strand, and the strand was pelletized through a pelletizer. The obtained pellets were continuously thrown into a hot bath tank adjusted at 98° C., and were stayed therein for 10 minutes at average, thereby causing crystallization. After that, the pellets were removed from water through a pellet continuous dehydrator, and polyoxyalkylene-modified polyalkylene terephthalate (A2-1) pellets were collected. A introduction ratio of the polyoxyethylene diadduct of bisphenol A, analyzed by $^1$H-NMR (proton nuclear magnetic resonance) analysis, was 25% by weight, and the IV value was 0.59.

Examples 1 to 26 and Comparative Examples 1 to 6

Polycarbonate Resin Composition

An aromatic polyester (component A), an aromatic polycarbonate (component B), a highly heat-resistant aromatic polycarbonate (component C), a graft-copolymer (component D), an ethylene copolymer (component E), a silicic acid filler (component F), an electric conductive filler (component G), a phosphorus compound (component H), an antioxidant (component J1), a releasing agent (component J2), an epoxy thermal stabilizer (component J3), and a pigment (component J4) were pre-mixed in ratios shown in Tables 1 to 3, and each mixture was melt-kneaded through a twin screw extruder "TEX-44SS" (manufactured by Japan Steel Works, Ltd.) at 310° C. to produce pellets. At that time, the silicate filler (component F) was supplied through a side feeder. A dumbbell and a bar test piece were produced from the obtained pellets through an injection molding machine "FN-1000" (manufactured by Nissei Plastic Industrial Co., Ltd.) in which a cylinder temperature was adjusted to 300° C. and a die temperature was adjusted to 100° C., and the physical properties were evaluated in the methods described above. In addition, a flat plate having size of 120 mm×120 mm×3 mm thickness were similarly produced through the injection molding machine "FN-1000" (manufactured by Nissei Plastic Industrial Co., Ltd.), and the plate was cut into a 60 mm×60 mm squire, and the surface impact strength was evaluated in the method described above. The melt flow rate (MFR) and the spiral flow length (SFL) were obtained in the methods described above. The evaluation results are shown in Tables 4 to 6.

TABLE 1

| | Material used | | Example 1 | Example 2 | Example 3 | Example 4 | Example 5 | Example 6 | Example 7 |
|---|---|---|---|---|---|---|---|---|---|
| Component A: Aromatic polyester | Component A1: Polyalkylene terephthalate | A1-1 | 30.5 | 30.5 | 27.5 | 27.5 | 30.5 | 23 | 30.5 |
| | | A1-2 | — | — | — | — | — | — | — |
| | | A1-3 | — | — | — | — | — | — | — |
| | Component A2: Polyoxyalkylene-modified polyalkylene terephthalate | A2-1 | — | — | 3 | — | — | — | — |
| | | A2-2 | — | — | — | 3 | — | — | — |
| Component B: Aromatic polycarbonate | | B-1 | — | — | — | — | — | — | 11.5 |
| | | B-2 | — | 11.5 | 11.5 | 11.5 | 16.5 | 13.5 | — |
| Component C: Highly heat-resistant aromatic polycarbonate | | C-1 | 46.5 | 35.0 | 35.0 | 35.0 | 30.0 | 40.5 | 35.0 |
| Component D: Graft-copolymer | | D-1 | 2 | 2 | 2 | 2 | 2 | 2 | 2 |
| | | D-2 | — | — | — | — | — | — | — |
| | | D-3 | — | — | — | — | — | — | — |
| | | D-4 | — | — | — | — | — | — | — |
| Component E: Ethylene copolymer | | E-1 | 2.5 | 2.5 | 2.5 | 2.5 | 2.5 | 2.5 | 2.5 |
| Component F: Silicate filler | | F-1 | 17.5 | 17.5 | 17.5 | 17.5 | 17.5 | 17.5 | 17.5 |
| | | F-2 | — | — | — | — | — | — | — |
| | | F-3 | — | — | — | — | — | — | — |
| | | F-4 | — | — | — | — | — | — | — |
| | | F-5 | — | — | — | — | — | — | — |
| | | F-6 | — | — | — | — | — | — | — |
| | | F-7 | — | — | — | — | — | — | — |
| Component G: Electric conductive filler | | G-1 | — | — | — | — | — | — | — |
| | | G-2 | — | — | — | — | — | — | — |
| Component H: Phosphorus compound | | H-1 | — | — | — | — | — | — | — |
| Component J: Other blend component | | J1-1 | 0.1 | 0.1 | 0.1 | 0.1 | 0.1 | 0.1 | 0.1 |
| | | J1-2 | 0.3 | 0.3 | 0.3 | 0.3 | 0.3 | 0.3 | 0.3 |
| | | J2-1 | — | — | — | — | — | — | — |
| | | J2-2 | 0.1 | 0.1 | 0.1 | 0.1 | 0.1 | 0.1 | 0.1 |
| | | J3-1 | 0.2 | 0.2 | 0.2 | 0.2 | 0.2 | 0.2 | 0.2 |
| | | J4-1 | 0.3 | 0.3 | 0.3 | 0.3 | 0.3 | 0.3 | 0.3 |
| Total amount of component A1/ total amount of component A | | wt % | 100 | 100 | 90 | 90 | 100 | 100 | 100 |
| Total amount of component C/ total amount of component B and component C | | wt % | 100 | 75 | 75 | 75 | 65 | 75 | 75 |
| Total amount of component and component C/ total amount of components A to C | | wt % | 60 | 60 | 60 | 60 | 60 | 70 | 60 |

| | Material used | | Example 8 | Example 9 | Example 10 | Example 11 | Example 12 | Example 13 | Example 14 | Example 15 |
|---|---|---|---|---|---|---|---|---|---|---|
| Component A: Aromatic polyester | Component A1: Polyalkylene terephthalate | A1-1 | 30.5 | 30.5 | 29 | — | — | 32.5 | 32.5 | 29.5 |
| | | A1-2 | — | — | — | 30.5 | — | — | — | — |
| | | A1-3 | — | — | — | — | 30.5 | — | — | — |
| | Component A2: Polyoxyalkylene-modified polyalkylene terephthalate | A2-1 | — | — | — | — | — | — | — | 3 |
| | | A2-2 | — | — | — | — | — | — | — | — |
| Component B: Aromatic polycarbonate | | B-1 | — | — | — | — | — | — | — | — |
| | | B-2 | 11.5 | 11.5 | 10.9 | 11.5 | 11.5 | 12.4 | 17.33 | 12.4 |

TABLE 1-continued

| Material used | | Example 1 | Example 2 | Example 3 | Example 4 | Example 5 | Example 6 | Example 7 |
|---|---|---|---|---|---|---|---|---|
| Component C: Highly heat-resistant aromatic polycarbonate | C-1 | 35.0 | 35.0 | 33.2 | 35.0 | 35.0 | 37.1 | 32.2 | 37.1 |
| Component D: Graft-copolymer | D-1 | — | — | 2 | 2 | 2 | 2 | 2 | 2 |
| | D-2 | 2 | — | — | — | — | — | — | — |
| | D-3 | — | — | — | — | — | — | — | — |
| | D-4 | — | — | — | — | — | — | — | — |
| Component E: Ethylene copolymer | E-1 | 2.5 | 2.5 | 2.5 | 2.5 | 2.5 | 2.5 | 2.5 | 2.5 |
| Component F: Silicate filler | F-1 | 17.5 | 17.5 | 16.8 | 17.5 | 17.5 | 12.5 | 12.5 | 12.5 |
| | F-2 | — | — | — | — | — | — | — | — |
| | F-3 | — | — | — | — | — | — | — | — |
| | F-4 | — | — | — | — | — | — | — | — |
| | F-5 | — | — | — | — | — | — | — | — |
| | F-6 | — | — | — | — | — | — | — | — |
| | F-7 | — | — | — | — | — | — | — | — |
| Component G: Electric conductive filler | G-1 | — | — | 0.7 | — | — | — | — | — |
| | G-2 | — | — | 4 | — | — | — | — | — |
| Component H: Phosphorus compound | H-1 | — | — | — | — | 0.05 | — | — | — |
| Component J: Other blend component | J1-1 | 0.1 | 0.1 | 0.1 | 0.1 | 0.1 | 0.1 | 0.1 | 0.1 |
| | J1-2 | 0.3 | 0.3 | 0.3 | 0.3 | 0.25 | 0.3 | 0.3 | 0.3 |
| | J2-1 | — | — | — | — | — | — | — | — |
| | J2-2 | 0.1 | 0.1 | 0.1 | 0.1 | 0.1 | 0.1 | 0.1 | 0.1 |
| | J3-1 | 0.2 | 0.2 | 0.2 | 0.2 | 0.2 | 0.2 | 0.2 | 0.2 |
| | J4-1 | 0.3 | 0.3 | 0.3 | 0.3 | 0.3 | 0.3 | 0.3 | 0.3 |
| Total amount of component A1/ total amount of component A | wt % | 100 | 100 | 100 | 100 | 100 | 100 | 100 | 91 |
| Total amount of component C/ total amount of component B and component C | wt % | 75 | 75 | 75 | 75 | 75 | 75 | 65 | 75 |
| Total amount of component B and component C/ total amount of components A to C | wt % | 60 | 60 | 60 | 60 | 60 | 60 | 60 | 60 |

TABLE 2

| Material used | | Example 16 | Example 17 | Example 18 | Example 19 | Example 20 | Example 21 | Example 22 | Example 23 | Example 24 | Example 25 | Example 26 |
|---|---|---|---|---|---|---|---|---|---|---|---|---|
| Component A: Aromatic polyester — Component A1: Polyalkylene terephthalate | A1-1 | 30.7 | 33.1 | 33.9 | 32.5 | 32.5 | 32.5 | 31.5 | 31.5 | 31.5 | 33.9 | 33.9 |
| | A1-2 | — | — | — | — | — | — | — | — | — | — | — |
| | A1-3 | — | — | — | — | — | — | — | — | — | — | — |
| Component A2: Polyoxyalkylene-modified polyalkylene terephthalate | A2-1 | — | — | — | — | — | — | 3.5 | 3.5 | 3.5 | — | — |
| | A2-2 | — | — | — | — | — | — | — | — | — | — | — |
| Component B: Aromatic polycarbonate | B-1 | — | — | — | — | — | — | — | — | — | — | — |
| | B-2 | 11.7 | 12.6 | 12.9 | 12.4 | 12.4 | 12.4 | 5.4 | 5.4 | 5.4 | 12.9 | 12.9 |
| Component C: Highly heat-resistant aromatic polycarbonate | C-1 | 35.1 | 37.8 | 38.7 | 37.1 | 37.1 | 37.1 | 47.0 | 47.0 | 47.0 | 38.7 | 38.7 |
| Component D: Graft-copolymer | D-1 | 2 | 2 | 2 | 2 | 2 | 2 | 3.5 | 3.5 | 3.5 | 1 | 0 |
| | D-2 | — | — | — | — | — | — | — | — | — | — | — |
| | D-3 | — | — | — | — | — | — | 0.8 | 0.8 | 0.8 | — | — |
| | D-4 | — | — | — | — | — | — | — | — | — | — | — |
| Component E: Ethylene copolymer | E-1 | 2.5 | 2.5 | 2.5 | 2.5 | 2.5 | 2.5 | 1 | 1 | 1 | 3.5 | 4 |
| Component F: Silicate filler | F-1 | 12.5 | 11 | 9 | — | — | — | — | — | — | 9 | 9 |
| | F-2 | — | — | — | 12.5 | — | — | 6 | — | — | — | — |
| | F-3 | — | — | — | — | — | — | — | 6 | — | — | — |

TABLE 2-continued

| Material used | | Example 16 | Example 17 | Example 18 | Example 19 | Example 20 | Example 21 | Example 22 | Example 23 | Example 24 | Example 25 | Example 26 |
|---|---|---|---|---|---|---|---|---|---|---|---|---|
| | F-4 | — | — | — | — | 12.5 | — | — | — | — | — | — |
| | F-5 | — | — | — | — | — | 12.5 | — | — | — | — | — |
| | F-6 | — | — | — | — | — | — | — | — | 6 | — | — |
| | F-7 | — | — | — | — | — | — | — | — | — | — | — |
| Component G: | G-1 | 0.5 | — | — | — | — | — | — | — | — | — | — |
| Electric conductive filler | G-2 | 4 | — | — | — | — | — | — | — | — | — | — |
| Component H: Phosphorus compound | H-1 | — | — | — | — | — | — | — | — | — | — | — |
| Component J: | J1-1 | 0.1 | 0.1 | 0.1 | 0.1 | 0.1 | 0.1 | 0.2 | 0.2 | 0.2 | 0.1 | 0.1 |
| Other blend component | J1-2 | 0.3 | 0.30 | 0.30 | 0.30 | 0.30 | 0.3 | 0.4 | 0.4 | 0.4 | 0.30 | 0.30 |
| | J2-1 | — | — | — | — | — | — | — | — | 0.4 | — | — |
| | J2-2 | 0.1 | 0.1 | 0.1 | 0.1 | 0.1 | 0.1 | 0.4 | 0.4 | — | 0.1 | 0.1 |
| | J3-1 | 0.2 | 0.2 | 0.20 | 0.2 | 0.2 | 0.2 | — | — | — | 0.20 | 0.20 |
| | J4-1 | 0.3 | 0.3 | 0.30 | 0.3 | 0.3 | 0.3 | 0.3 | 0.3 | 0.3 | 0.30 | 0.30 |
| Total amount of component A1/ total amount of component A | wt % | 100 | 100 | 100 | 100 | 100 | 100 | 90 | 90 | 90 | 100 | 100 |
| Total amount of component C1 total amount of component B and component C | wt % | 75 | 75 | 75 | 75 | 75 | 75 | 90 | 90 | 90 | 75 | 75 |
| Total amount of component B and component C/ total amount of components A to C | wt % | 60 | 60 | 60 | 60 | 60 | 60 | 60 | 60 | 60 | 60 | 60 |

TABLE 3

| Material used | | | Comparative Example 1 | Comparative Example 2 | Comparative Example 3 | Comparative Example 4 | Comparative Example 5 | Comparative Example 6 |
|---|---|---|---|---|---|---|---|---|
| Component A: Aromatic polyester | Component A1: Polyalkylene terephthalate | A1-1 | 27.5 | 30.5 | 31.5 | 26.5 | 32.5 | 33.5 |
| | | A1-2 | — | — | — | — | — | — |
| | Component A2: Polyoxyalkylene-modified polyalkylene terephthalate | A1-3 | — | — | — | — | — | — |
| | | A2-1 | 3 | — | 3.5 | — | — | — |
| | | A2-2 | — | — | — | — | — | — |
| Component B: Aromatic polycarbonate | | B-1 | — | — | — | — | — | — |
| | | B-2 | 46.5 | 23.2 | 52.4 | 10 | 12.4 | 12.8 |
| Component C: Highly heat-resistant aromatic polycarbonate | | C-1 | — | 23.3 | — | 30.5 | 37.1 | 38.2 |
| Component D: Graft-copolymer | | D-1 | 2 | 2 | 3.5 | 12 | 2 | 2 |
| | | D-2 | — | — | — | — | — | — |
| | | D-3 | — | — | 0.8 | — | — | — |
| | | D-4 | — | — | — | — | — | — |
| Component E: Ethylene copolymer | | E-1 | 2.5 | 2.5 | 1 | 2.5 | 2.5 | 2.5 |
| Component F: Silicate filler | | F-1 | 17.5 | 17.5 | — | 17.5 | — | — |
| | | F-2 | — | — | 6 | — | — | — |
| | | F-3 | — | — | — | — | — | — |
| | | F-4 | — | — | — | — | — | — |
| | | F-5 | — | — | — | — | — | — |
| | | F-6 | — | — | — | — | — | — |
| | | F-7 | — | — | — | — | 12.5 | 10 |
| Component G: Electric conductive filler | | G-1 | — | — | — | — | — | — |
| | | G-2 | — | — | — | — | — | — |
| Component H: Phosphorus compound | | H-1 | — | — | — | — | — | — |
| Component J: Other blend component | | J1-1 | 0.1 | 0.1 | 0.2 | 0.1 | 0.1 | 0.1 |
| | | J1-2 | 0.3 | 0.3 | 0.4 | 0.3 | 0.3 | 0.3 |
| | | J2-1 | — | — | — | — | — | — |
| | | J2-2 | 0.1 | 0.1 | 0.4 | 0.1 | 0.1 | 0.1 |
| | | J3-1 | 0.2 | 0.2 | — | 0.2 | 0.2 | 0.2 |
| | | J4-1 | 0.3 | 0.3 | 0.3 | 0.3 | 0.3 | 0.3 |
| Total amount of component A1/ total amount of component A | | wt % | 90 | 100 | 90 | 100 | 100 | 100 |
| Total amount of component C/ total amount of component B and component C | | wt % | 0 | 50 | 0 | 75 | 75 | 75 |
| Total amount of component B and component C/ total amount of components A to C | | wt % | 60 | 60 | 60 | 60 | 60 | 60 |

TABLE 4

| Measurement item | Condition | Unit | Example 1 | Example 2 | Example 3 | Example 4 | Example 5 | Example 6 | Example 7 |
|---|---|---|---|---|---|---|---|---|---|
| MFR | 280° C., 21.18 N | g/10 min | 5.5 | 9.9 | 11.1 | 9.6 | 10.9 | 5.1 | 10.7 |
| SFL | 2 mmt, 300° C./M80° C. | mm | 355 | 380 | 410 | 395 | 390 | 340 | 385 |
| Coefficient of linear expansion (DTUL) | 1.80 MPa (A method) | ° C. | 164 | 153 | 152 | 151 | 150 | 155 | 153 |
| | 0.45 MPa (B method) | ° C. | 185 | 173 | 172 | 170 | 168 | 172 | 171 |
| Heat sag | 140° C. | mm | 1 | 2 | 2 | 2 | 2 | 1 | 2 |
| | 160° C. | mm | 3 | 4 | 4 | 5 | 6 | 5 | 4 |
| Surface appearance | — | — | ○ | ○ | ○ | ○ | ◎ | ○ | ○ |
| Coefficient of linear expansion | −30 to 80° C., MD | e-5 | 3.7 | 3.8 | 3.9 | 3.9 | 3.8 | 3.6 | 3.8 |
| | −30 to 80° C., TD | e-5 | 4.4 | 4.6 | 4.7 | 4.8 | 4.6 | 4.3 | 4.7 |
| Yield strength | 23° C. | MPa | — | 74 | 74 | 71 | 75 | 76 | 75 |
| Breaking strength | 23° C. | MPa | 68 | 72 | 71 | 69 | 74 | 74 | 74 |
| Breaking elongation | 23° C. | % | 3.9 | 4.2 | 4.1 | 4.0 | 4.6 | 4.0 | 4.1 |
| Bending strength | 23° C. | MPa | 111 | 118 | 115 | 112 | 124 | 133 | 117 |
| Flexural modulus | 23° C. | MPa | 5510 | 5620 | 5640 | 5460 | 5590 | 5500 | 5610 |
| IZOD strength | 23° C. | J/m | 47 | 50 | 47 | 52 | 51 | 57 | 49 |
| IZOD strength | −30° C. | J/m | 36 | 39 | 39 | 40 | 40 | 38 | 38 |
| Surface impact strength | 23° C. | J | 8.6 | 11 | 9.8 | 12 | 11 | 9.8 | 12 |
| | −30° C. | J | 2.5 | 3.7 | 2.5 | 3.7 | 5.0 | 3.7 | 3.7 |
| Volume resistivity | 23° C. 3 mm-thickness | Ω cm | $10^{14}$ | $10^{14}$ | $10^{14}$ | $10^{14}$ | $10^{14}$ | $10^{14}$ | $10^{14}$ |
| Specific gravity | | — | 1.33 | 1.33 | 1.33 | 1.32 | 1.33 | 1.32 | 1.33 |

| Measurement item | Condition | Unit | Example 8 | Example 9 | Example 10 | Example 11 | Example 12 | Example 13 | Example 14 | Example 15 |
|---|---|---|---|---|---|---|---|---|---|---|
| MFR | 280° C., 21.18 N | g/10 min | 7.2 | 10.9 | 5.5 | 10.4 | 10.3 | 10.2 | 10.4 | 10.7 |
| SFL | 2 mmt, 300° C./M80° C. | mm | 370 | 390 | 350 | 380 | 375 | 375 | 380 | 395 |
| Coefficient of linear expansion (DTUL) | 1.80 MPa (A method) | ° C. | 154 | 153 | 166 | 153 | 151 | 151 | 150 | 150 |
| | 0.45 MPa (B method) | ° C. | 172 | 173 | 176 | 172 | 171 | 173 | 170 | 170 |
| Heat sag | 140° C. | mm | 2 | 2 | 1 | 1 | 2 | 2 | 2 | 2 |
| | 160° C. | mm | 4 | 3 | 1 | 5 | 6 | 5 | 6 | 4 |
| Surface appearance | — | — | ◎ | ○ | ○ | ○ | ○ | ◎ | ◎ | ◎ |
| Coefficient of linear expansion | −30 to 80° C., MD | e-5 | 3.7 | 3.5 | 2.0 | 3.8 | 3.7 | 4.5 | 4.6 | 4.7 |
| | −30 to 80° C., TD | e-5 | 4.7 | 4.3 | 4.4 | 4.6 | 4.5 | 5.3 | 5.3 | 5.5 |
| Yield strength | 23° C. | MPa | 72 | 72 | — | 74 | 74 | 69 | 70 | 70 |
| Breaking strength | 23° C. | MPa | 72 | 70 | 96 | 73 | 71 | 62 | 64 | 69 |
| Breaking elongation | 23° C. | % | 4.4 | 4.5 | 3.5 | 4.1 | 4.5 | 6.6 | 6.9 | 4.6 |
| Bending strength | 23° C. | MPa | 119 | 97 | 136 | 118 | 125 | 121 | 125 | 118 |
| Flexural modulus | 23° C. | MPa | 5640 | 5400 | 7670 | 5730 | 5650 | 4590 | 4540 | 4400 |
| IZOD strength | 23° C. | J/m | 45 | 52 | 51 | 37 | 50 | 57 | 58 | 48 |
| IZOD strength | −30° C. | J/m | 36 | 41 | 41 | 35 | 37 | 45 | 46 | 39 |
| Surface impact strength | 23° C. | J | 12 | 11 | 12 | 7.4 | 11 | ≥22 | ≥22 | 12 |
| | −30° C. | J | 3.7 | 3.7 | 3.7 | 1.2 | 2.5 | 6.1 | 7.4 | 5.0 |

TABLE 4-continued

| | | | | | | | | | | |
|---|---|---|---|---|---|---|---|---|---|---|
| Volume resistivity | 23° C. 3 mm-thickness | Ω cm | $10^{14}$ | $10^{14}$ | $10^{2}$ | $10^{14}$ | $10^{14}$ | $10^{14}$ | $10^{14}$ | $10^{14}$ |
| Specific gravity | | — | 1.33 | 1.34 | 1.35 | 1.34 | 1.34 | 1.30 | 1.30 | 1.30 |

TABLE 5

| Measurement item | Condition | Unit | Example 16 | Example 17 | Example 18 | Example 19 | Example 20 | Example 21 | Example 22 | Example 23 | Example 24 | Example 25 | Example 26 |
|---|---|---|---|---|---|---|---|---|---|---|---|---|---|
| MFR | 280° C., 21.18 N | g/10 min | 8.5 | 10.7 | 11.2 | 9.5 | 9.2 | 9.9 | 4.3 | 4.4 | 2.9 | 11.3 | 11.5 |
| SFL | 2 mmt, 300 C°./M80° C. | mm | 335 | 370 | 360 | 375 | 325 | 365 | 285 | 300 | 295 | 365 | 375 |
| Deflection temperature under load (DTUL) | 1.80 MPa (A method) | ° C. | 165 | 151 | 150 | 149 | 153 | 165 | 151 | 150 | 150 | 151 | 153 |
| | 0.45 MPa (B method) | ° C. | 177 | 172 | 171 | 169 | 173 | 173 | 169 | 169 | 167 | 172 | 175 |
| Heat sag | 140° C. | mm | 1 | 2 | 2 | 2 | 2 | 2 | 1 | 1 | 1 | 2 | 1 |
| | 160° C. | mm | 1 | 5 | 5 | 5 | 4 | 5 | 3 | 3 | 4 | 4 | 3 |
| Surface appearance | — | — | ○ | ◎ | ◎ | ◎ | Δ | ◎ | ○ | ○ | ○ | ◎ | ◎ |
| Coefficient of linear expansion | −30 to 80° C., MD | e-5 | 2.4 | 4.7 | 5.3 | 5.2 | 4.3 | 4.3 | 5.6 | 5.9 | 5.9 | 5.2 | 5.2 |
| | −30 to 80° C., TD | e-5 | 5.0 | 5.4 | 5.8 | 6.0 | 5.0 | 5.2 | 6.3 | 6.8 | 6.8 | 5.9 | 5.7 |
| Yield strength | 23° C. | MPa | — | 68 | 66 | 66 | 67 | 68 | 65 | 65 | 63 | 65 | 66 |
| Breaking strength | 23° C. | MPa | 89 | 59 | 51 | 51 | 58 | 60 | 44 | 43 | 51 | 51 | 50 |
| Breaking elongation | 23° C. | % | 5.1 | 7.1 | 10 | 11 | 6.8 | 6.3 | 41 | 37 | 11 | 12 | 11 |
| Bending strength | 23° C. | MPa | 132 | 119 | 115 | 113 | 117 | 120 | 104 | 105 | 102 | 115 | 114 |
| Flexural modulus | 23° C. | MPa | 7090 | 4380 | 3980 | 3670 | 4400 | 4510 | 3050 | 3080 | 2740 | 3950 | 3900 |
| IZOD strength | 23° C. | J/m | 54 | 59 | 72 | 73 | 57 | 59 | 73 | 92 | 56 | 75 | 80 |
| IZOD strength | −30° C. | J/m | 42 | 45 | 47 | 48 | 49 | 47 | 32 | 43 | 32 | 46 | 46 |
| Surface impact strength | 23° C. | J | 15 | ≥22 | ≥22 | ≥22 | 8.6 | ≥22 | ≥22 | ≥22 | ≥22 | ≥22 | ≥22 |
| | −30° C. | J | 5.0 | 6.1 | 17.0 | 6.1 | 2.5 | 6.1 | 14.7 | 17.2 | 9.8 | 17.0 | 19.0 |
| Volume resistivity | 23° C. 3 mm-thickness | Ω cm | $10^{2}$ | $10^{14}$ | $10^{14}$ | $10^{14}$ | $10^{14}$ | $10^{14}$ | $10^{14}$ | $10^{14}$ | $10^{14}$ | $10^{14}$ | $10^{14}$ |
| Specific gravity | | — | 1.32 | 1.29 | 1.27 | 1.29 | 1.29 | 1.30 | 1.24 | 1.24 | 1.26 | 1.27 | 1.27 |

TABLE 6

| Measurement item | Condition | Unit | Comparative Example 1 | Comparative Example 2 | Comparative Example 3 | Comparative Example 4 | Comparative Example 5 | Comparative Example 6 |
|---|---|---|---|---|---|---|---|---|
| MFR | 280° C., 21.18 N | g/10 min | 27.5 | 20.6 | 28.5 | 4.9 | 5.7 | 5.6 |
| SFL | 2 mmt, 300° C/M80° C. | mm | 500 | 460 | 510 | 355 | 355 | 350 |
| Deflection temperature under load (DTUL) | 1.80 MPa (A method) | ° C. | 120 | 123 | 121 | 146 | 151 | 151 |
| | 0.45 MPa (B method) | ° C. | 131 | 134 | 131 | 164 | 169 | 168 |
| Heat sag | 140° C. | mm | 16 | 7 | 29 | 4 | 2 | 2 |
| | 160° C. | mm | 30 | 19 | >35 | 9 | 4 | 5 |
| Surface appearance | — | — | ○ | ○ | ○ | ○ | ◎ | ◎ |
| Coefficient of linear expansion | −30 to 80° C., MD | e-5 | 3.9 | 3.9 | 6.7 | 5.2 | 5.3 | 5.5 |
| | −30 to 80° C., TD | e-5 | 4.1 | 4.3 | 7.1 | 5.8 | 6.3 | 6.5 |
| Yield strength | 23° C. | MPa | 68 | 70 | 57 | 62 | 65 | 65 |
| Breaking strength | 23° C. | MPa | 53 | 57 | 58 | 66 | 63 | 63 |
| Breaking elongation | 23° C. | % | 5.3 | 4.8 | 69 | 5.4 | 5.8 | 6.4 |
| Bending strength | 23° C. | MPa | 118 | 120 | 91 | 103 | 104 | 104 |
| Flexural modulus | 23° C. | MPa | 5390 | 5500 | 2970 | 4960 | 3450 | 3290 |
| IZOD strength | 23° C. | J/m | 53 | 51 | 380 | 105 | 45 | 50 |
| IZOD strength | −30° C. | J/m | 49 | 45 | 64 | 48 | 41 | 44 |
| Surface impact strength | 23° C. | J | 12.0 | 12.0 | ≥22 | 12 | 2.5 | 3.2 |
| | −30° C. | J | 5.0 | 3.7 | ≥22 | 7.4 | 1.2 | 1.2 |
| Volume resistivity | 23° C. 3 mm-thickness | Ω cm | $10^{14}$ | $10^{14}$ | $10^{14}$ | $10^{14}$ | $10^{14}$ | $10^{14}$ |
| Specific gravity | | — | 1.33 | 1.33 | 1.27 | 1.32 | 1.30 | 1.28 |

As shown in Tables 4 to 6, it is found that the resin compositions from Examples 1 to 26, having a deflection temperature under load (A method) of 130° C. or higher, compared to the compositions from Comparative Examples 1 to 3 having a deflection temperature under load of lower than 130° C., have the smaller deformation quantity in the heat sag test (140° C. and 160° C.), and have the more excellent balance among the heat resistance, the coefficient of linear expansion, and the mechanical properties, and thus they can be applied to the baking process of the base coating or clear coating for an automobile, in which the coating are exposed to a high temperature of 140° C. or higher. In addition, it is found that the resin compositions from Examples 1 to 26, compared to the composition from Comparative Example 4 having a deflection temperature under load (A method) of higher than 140° C., but containing more than 10% by weight of the graft-copolymer (component D), have the smaller deformation quantity in the heat sag test (140° C. and 160° C.), and has the more excellent balance among the heat resistance, the coefficient of linear expansion and the mechanical properties, and thus they can be applied to the baking process. Furthermore, the resin compositions from Examples 1 to 26 using the white mica, silk mica or kaolin as the silicate filler (component F), compared to the compositions from Comparative Examples 5 and 6 using the talc, has a surface impact strength of 7 J or more at an ordinary temperature (23° C.), i.e., has the excellent balance between the coefficient of linear expansion and the impact resistance, and thus they can be applied to the exterior or outer panel member for an automobile.

The volume resistivities of the resin compositions in Examples 10 and 16 are reduced to about $1 \times 10^2$ Ω·cm by further containing the electric conductive filler, and it is found that they can also be applied to the electrostatic coating.

Retentions in the Izod strength (23° C.) obtained by measuring impact resistance test pieces (Izod test pieces), which were produced from the resin compositions from Examples 18, 25, and 26, and subjected to a heat-treatment at 120° C. for 800 hours (i.e., ratios obtained by dividing the Izod strength after the heat-treatment by the Izod strength before the heat-strength) were 65%, 70%, and 90%, respectively. It was found that the higher the ratio of the ethylene copolymer (component E) in the total of the graft-copolymer (component D) and the component E, the superior the inhibition of the thermal deterioration.

(Production Example 2) Production of Basecoat Coating Material

The production was performed according to Example 1 in Patent Document 8.

First, in a reactor equipped with a stirrer, a nitrogen line, a reflux cooler with a gas outlet, and a reflux condenser were put 50 parts by weight of a monomer mixture containing 2-hydroxyethyl methacrylate/styrene/methyl methacrylate/butyl methacrylate/butyl acrylate in a composition ratio of 10/35/10/15/30% by mole, and 50 parts by weight of xylene, and nitrogen bubbling was performed at 10° C. After 0.5 parts by weight of 2,2'-azobis(2,4-dimethyl valeronitrile) "V-65" (manufactured by Wako Pure Chemical Industries, Ltd.) was added thereto, the temperature was elevated to 50° C. while the mixture was stirred, and the polymerization reaction was performed for 8 hours. After that, the temperature was elevated to 65° C., and the reaction was performed for further 4 hours. After that, a small amount of air was introduced into the gas phase part, which was cooled down to room temperature, thereby finishing the reaction. A solution having a solid concentration of 50% by weight and containing an acrylic resin K2-1 having a GPC molecular weight of 15,000.

Second, in a reactor equipped with a stirrer, a nitrogen line, a reflux cooler with a gas outlet, and a reflux condenser were put 50 parts by weight of a monomer mixed liquid containing glycidyl methacrylate/2-hydroxyethyl methacrylate/styrene/methyl methacrylate/butyl methacrylate/butyl acrylate in a composition ratio of 5/10/35/10/15/20% by mole, and 50 parts by weight of xylene, and nitrogen bubbling was performed at 10° C. After 0.5 parts by weight of V-65 was added thereto, the temperature was elevated to 50° C. while the mixture was stirred, and the polymerization reaction was performed for 8 hours. After that, the temperature was elevated to 65° C., and the reaction was performed for further 4 hours. After that, a small amount of air was introduced into the gas phase part, which was cooled down to room temperature, thereby finishing the reaction. A solution having a solid concentration of 50% by weight and containing an acrylic resin K2-2 having a GPC molecular weight of 14,500.

A mixture containing 78 parts by weight (solid: 39 parts by weight) of the acrylic resin K2-1 solution, obtained above, 52 parts by weight (solid: 26 parts by weight) of the acrylic resin K2-2 solution, 35 parts by weight of a n-butylated melamine resin "U-VAN® 20SE-60" (manufactured by Mitsui Chemicals Inc.), 3 parts by weight of an aluminum paste "SAP720N" (manufactured by Showa Aluminum Powder K. K.), 1 part by weight of a higher fatty acid amide rheology-adjusting agent "FLOWNON SH-290" (manufactured by Kyoeisha Chemical Co., Ltd.), 0.5 parts by weight of a benzotriazol ultraviolet absorber "Tinubin® 900" (manufactured by BASF JAPAN LTD.), 0.1 parts by weight of an activator acrylic polymer surface conditioner "MODA-FLOW RESIN" (manufactured by Nihon Cytec Industries Inc.), 2 parts by weight of butyl acetate, 5 parts by weight of xylene, and 2 parts by weight of n-butanol was mixed in a homodisper for 20 minutes, whereby a basecoat coating material was produced.

Patent Document 8: JP-A-2003-268300

(Production Example 3) Production of Clear Coating Material

The production was performed according to Example 1 in Patent Document 8.

First, in a reactor equipped with a stirrer, a nitrogen line, a reflux cooler with a gas outlet, and a reflux condenser were put 60 parts by weight of a monomer mixture containing glycidyl methacrylate/methyl methacrylate/2-ethylhexyl methacrylate/2-ethylhexyl acrylate/styrene/silicone (meth) acrylate "Silaplain TM-0701" (manufactured by JNC Corporation) in a composition ratio of 47/16/4/7/19/6% by mole, and 40 parts by weight of xylene, and nitrogen bubbling was performed at 10° C. After 0.5 parts by weight of 2,2'-azobis(2,4-dimethyl valeronitrile) "V-65" (manufactured by Wako Pure Chemical Industries, Ltd.) was added thereto, the temperature was elevated to 50° C. while the mixture was stirred, and the polymerization reaction was performed for 8 hours. After that, the temperature was elevated to 65° C., and the reaction was performed for further 4 hours. After that, a small amount of air was introduced into the gas phase part, which was cooled down to room temperature, thereby finishing the reaction. A solution having a solid concentration of 60% by weight and containing an acrylic resin K1-1 having a GPC molecular weight of 13,200.

Second, in a reactor equipped with a stirrer, a nitrogen line, a reflux cooler with a gas outlet, and a reflux condenser were put 60 parts by weight of a monomer mixture containing glycidyl methacrylate/methyl methacrylate/2-ethylhexyl methacrylate/2-ethylhexyl acrylate/styrene in a composition ratio of 50/17/4/7/21% by mole, and 40 parts by weight of xylene, and nitrogen bubbling was performed at 10° C. After 0.5 parts by weight of V-65 was added thereto, the temperature was elevated to 50° C. while the mixture was stirred, and the polymerization reaction was performed for 8 hours. After that, the temperature was elevated to 65° C., and the reaction was performed for further 4 hours. After that, a small amount of air was introduced into the gas phase part, which was cooled down to room temperature, thereby finishing the reaction. A solution having a solid concentration of 60% by weight and containing an acrylic resin K1-2 having a GPC molecular weight of 13,400.

Third, in a reactor equipped with a stirrer, a nitrogen line, and a reflux cooler with a gas outlet were put 11.0 parts by weight of trimethylol propane and 24.5 parts by weight of succinic anhydride in a nitrogen atmosphere, and the mixture was reacted. After that, 40 parts by weight of xylene and 0.3 parts by weight of acetyl chloride, and the mixture was stirred in a nitrogen atmosphere, to which 24.5 parts by weight of n-butyl vinyl ether was added dropwise over 2 hours while the temperature was maintained at 30° C. The temperature was elevated to 40° C., and the mixture was maintained for 4 hours, then the reaction was finished. A solution having a solid concentration of 60% by mass and containing an acid cross-linking agent having a GPC molecular weight of 790 was obtained.

A mixture containing 8.3 parts by weight (solid: 5 parts by weight) of the acrylic resin K1-1 solution, obtained above, 83 parts by weight (solid: 50 parts by weight) of the acrylic resin K1-2 solution, 75 parts by weight (solid: 45 parts by weight) of the acid cross-linking solution, 0.6 parts by weight of a benzotriazol ultraviolet absorber "Tinubin® 900" (manufactured by BASF JAPAN LTD.), 0.3 parts by weight of a hindered amine derivative light stabilizer "Tinubin® 440" (manufactured by BASF JAPAN LTD.), 0.1 parts by weight of an activator acrylic polymer surface conditioner "MODAFLOW 9200" (manufactured by Nihon Cytec Industries Inc.), 10 parts by weight of xylene, and 2 parts by weight of butyl acetate was mixed in a homodisper for 20 minutes, whereby a clear coating material was produced.

Examples 27 to 52 and Comparative Examples 7 to 12

The pellets obtained in Examples 1 to 26 and Comparative Examples 1 to 6 were dried at 130° C. for 5 hours. Using an injection molding machine "850MG" (manufactured by Mitsubishi Heavy Industries, Ltd.) in which a cylinder temperature was adjusted to 300° C. and a die temperature was adjusted to 100° C., a flat plate molded article (10) (FIG. 1A, FIG. 1B, FIG. 1C) having a length of 780 mm, a width of 130 mm, and a thickness of 2 mm, on which 6 clip seats were provided on its back surface, which was supposed to be an automobile outer panel, was produced from the dried pellets. Two center clip seats (12) had circular screw holes and had a structure in which the seats were completely fixed on a jig. Four screw holes on the clip seats (13) on both edge parts were U-shaped holes opening in a direction of the center clip seats (12) (FIG. 1B), and had a structure to escape a stress loading applied to the clip seat (13) upon expansion/shrinkage of the molded article (10) due to heat or moisture. The molding used both a hot runner system at 290° C. and a three-point hydraulic timing gate system. A projected area was 101,4000 mm².

Separately, two dull steel plates, which were subjected to a chemical conversion treatment with zinc phosphate, had a length of 160 mm, a width of 130 mm, and a thickness of 2 mm, and had 4 circular screw holes, were cation painted with an epoxy cationic electrodeposition coating material "Electron® KG400PF Gray" (manufactured by Kansai Paint Co., Ltd.) in a coating layer thickness of 20 μm, which was baked at 140° C. for 20 minutes.

The molded article (10), obtained as described above, was fastened with screws to a molded article-assembling part (11) of a SUS 316 L stainless steel jig for evaluating coating, shown in FIG. 2A and FIG. 2B, (external dimensions: length: 1100 mm, width: 130 mm, thickness: 2 mm) at the clip seats (FIG. 3A, and FIG. 3B, and FIG. 3C). In addition, the steel plates (20) after the cationic electrodeposition coating were fastened with screws to a steel plate-assembling part (21) of the jig for evaluating coating (30) (FIG. 2A and FIG. 2B), 1.00 mm spaces being formed between the plate and the molded article (10), whereby they were completely fixed (FIG. 3A, and FIG. 3B, and FIG. 3C). At that time, a stainless steel screw spacer was put between the steel plate (20) and the jig (30) to perform control, so that the molded article (10) surface and the steel plate (20) surface had the same height. This assembling operation was performed in a constant temperature and constant humidity room having a temperature of 23° C. and a humidity of 50%, after the molded article and the steel plated, which had been subjected to the cationic electrodeposition coating, were subjected to the condition adjustment for 24 hours in the same room.

The jig (30) to which the molded article (10) and the steel plate (20) were assembled was air-sprayed with an epoxy polyester melamine coating material "Clean Baking Primer Surfacer 400 Gray" (manufactured by Kansai Paint Co., Ltd.) in a coating layer thickness of 30 μm, which was baked at 140° C. for 20 minutes. The resulting product was air-sprayed with a solution in which the basecoat coating material, obtained in Production Example 2, was diluted with a thinner (xylene/butyl acetate=8/2 weight ratio) by 2 times in a dry coating layer thickness of 13 μm, which was pre-dried at 80° C. for 3 minutes. Next, the product was air-sprayed with the clear coating material, obtained in Production Example 3, in a dry coating layer thickness of 35 μm, which was pre-dried at 80° C. for 5 minutes. The resulting product was baked at 150° C. for 30 minutes. The obtained molded article (10) coated and the steel plate (20) were evaluated by each of the following tests while they were fixed to the jig (30).

<Coating Appearance>

A deflection quantity of the surface of the obtained, coated molded article was measured, and was defined as the deformation quantity. The obtained, coated molded article part and steel plate part were visually compared, and whether or not there was a difference in the coating surface appearance between the molded article part and the steel plate part was confirmed. The appearance difference was evaluated by pointing according to the following criteria 3: There was no difference in the gloss regardless of a viewing angle.

2: There was no difference in the gloss when it was observed in a normal line direction of the molded article surface and the steel plate surface, but the gloss difference could be recognized when it was observed at an angle of 20° from the surface in a lighting condition.
1: The gloss was different when it was observed from any angle.
<Heat Cycle Test>
The molded article and the steel plate, used in the evaluation of the coating appearance as described above, was subjected to a heat cycle test at −30° C. to 80° C., while they were fixed to the jig. The retention time at −30° C. or 80° C. was adjusted to one hour, and temperature elevation and temperature falling times were adjusted to one hour. After the sample was maintained at 80° C. for one hour at the first time, the presence or absence of the contact of the molded article with the steel plate was confirmed. Further, after the cycle test was repeated 20 times, the presence or absence of damage on the molded article or the steel plate edge part was visually confirmed. The results were evaluated by pointing according to the following criteria.
4: There was neither damage on the coating layer nor contact of the molded article with the steel plate.
3: There was no damage on the coating layer but the molded article was brought into contact with the steel plate at 80° C.
2: Coating layer damage such as a dent or scratch was generated.
1: Coating layer damage such as peeling-off or breakage was generated.
<Warm Water Immersion Test>
The molded article and the steel plate, used in the evaluation of the coating appearance as described above, was immersed in a warm water bath having a temperature of 50° C. for 5 hours, while they were fixed to the jig. After the immersion, water was quickly wiped up. The presence or absence of the contact of the molded article with the steel plate was confirmed, and the height of a bump or the depth of a dent on the molded article surface of the sample having the contact was measured, which was defined as the deformation quantity.

Evaluation results in the coating appearance, the heat cycle test, and the warm water immersion test, described above, are shown in Tables 7 to 9.

TABLE 7

| Evaluation item | | | Example 27 | Example 28 | Example 29 | Example 30 | Example 31 | Example 32 | Example 33 | Example 34 |
|---|---|---|---|---|---|---|---|---|---|---|
| | Resin composition used | | Example 1 | Example 2 | Example 3 | Example 4 | Example 5 | Example 6 | Example 7 | Example 8 |
| | Coating appearance | Deformation quantity | 0.0 | 0.5 | 0.5 | 0.5 | 0.5 | 0.0 | 0.5 | 0.5 |
| | | Difference in appearance | 3 | 3 | 3 | 3 | 2 | 3 | 3 | 3 |
| | Heat cycle test | Contact and damage on coating film | 4 | 4 | 4 | 4 | 4 | 4 | 4 | 4 |
| | Warm water immersion test | Contact | Absence | Absence | Absence | Absence | Absence | Absence | Absence | Absence |
| | | Deformation quantity | 0.0 | 0.0 | 0.0 | 0.0 | 0.0 | 0.0 | 0.0 | 0.0 |

| | | | Example 35 | Example 36 | Example 37 | Example 38 | Example 39 | Example 40 | Example 41 |
|---|---|---|---|---|---|---|---|---|---|
| | Resin composition used | | Example 9 | Example 10 | Example 11 | Example 12 | Example 13 | Example 14 | Example 15 |
| Evaluation item | Coating appearance | Deformation quantity | 0.5 | 0.0 | 0.0 | 0.5 | 0.5 | 0.5 | 0.5 |
| | | Difference in appearance | 3 | 3 | 3 | 3 | 3 | 3 | 3 |
| | Heat cycle test | Contact and damage on coating film | 4 | 4 | 4 | 4 | 4 | 4 | 4 |
| | Warm water immersion test | Contact | Absence | Absence | Absence | Absence | Absence | Absence | Absence |
| | | Deformation quantity | 0.0 | 0.0 | 0.0 | 0.0 | 0.0 | 0.0 | 0.0 |

TABLE 8

| | | | Example 42 | Example 43 | Example 44 | Example 45 | Example 46 | Example 47 | Example 48 | Example 49 | Example 50 | Example 51 | Example 52 |
|---|---|---|---|---|---|---|---|---|---|---|---|---|---|
| | Resin composition used | | Example 16 | Example 17 | Example 18 | Example 19 | Example 20 | Example 21 | Example 22 | Example 23 | Example 24 | Example 25 | Example 26 |
| Evaluation item | Coating appearance | Deformation quantity | 0.0 | 0.5 | 0.5 | 0.5 | 0.5 | 0.5 | 0.0 | 0.0 | 0.0 | 0.5 | 0.5 |
| | | Difference in appearance | 3 | 3 | 3 | 3 | 2 | 3 | 2 | 2 | 2 | 3 | 3 |
| | Heat cycle test | Contact and damage on coating film | 4 | 4 | 3 | 3 | 4 | 4 | 3 | 2 | 2 | 3 | 3 |
| | Warm water immersion test | Contact | Absence | Absence | Absence | Absence | Absence | Absence | Absence | Absence | Absence | Absence | Absence |
| | | Deformation quantity | 0.0 | 0.0 | 0.0 | 0.0 | 0.0 | 0.0 | 0.0 | 0.0 | 0.0 | 0.0 | 0.0 |

TABLE 9

|  |  |  | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|
|  | Resin composition used |  | Comparative Example 1 | Comparative Example 2 | Comparative Example 3 | Comparative Example 4 | Comparative Example 5 | Comparative Example 6 | Production Example 4 |
| Evaluation item | Coating appearance | Deformation quantity | 4.0 | 2.0 | 7.5 | 1.5 | 0.5 | 1.0 | 0.0 |
|  |  | Difference in appearance | 1 | 1 | 1 | 2 | 3 | 3 | 3 |
|  | Heat cycle test | Contact and damage on coating film | 4 | 4 | 1 | 3 | 3 | 3 | 3 |
|  | Warm water immersion test | Contact | Absence | Absence | Absence | Absence | Absence | Absence | Presence |
|  |  | Deformation quantity | 0.0 | 0.0 | 0.0 | 0.0 | 0.0 | 0.0 | 2.0 |

As shown in Tables 7 to 9, in the laminated molded articles from Comparative Examples 7 to 10 and 12, 1 mm or more deformation was observed after the baking-finish, and in Comparative Examples 7 to 9, the remarkable difference in the coating appearance was also observed between the laminated molded article part and the steel plate part. On the other hand, in the laminated molded articles from Examples 27 to 52, the deformation quantity was reduced to less than 1 mm and there was no difference in the appearance, and thus it is found that they can be applied to the baking process of the base coating or clear coating in the exterior or outer panel member for an automobile, in which the temperature reached a high temperature. In the laminated molded article from Comparative Example 9, the damage was observed on the coating layer on the laminated molded article or the edge part of the steel plate after the heat cycle test, due to the contact of the laminated molded article with the steel plate caused by the thermal expansion. On the other hand, in the laminated molded article from Examples 27 to 52, neither the contact nor the damage on the coating layer was observed, and thus it is found they can suitably maintain the appearance as the exterior or outer panel member for an automobile. In the laminated molded article from Comparative Examples 11 and 12, the surface impact strength (23° C.) of the resin composition used (Comparative Examples 5 and 6, respectively) were low, and thus they were not, in the first place, suitable for the exterior or outer panel member for an automobile.

(Production Example 4) Polyamide Resin Composition 25 parts by weight of polyamide PA6 "Unitika Nylon 6 A1020BRL" (manufactured by Unitika Ltd.), 21 parts by weight of the polyamide PA6 "Unitika Nylon 6 A1030BRL" (manufactured by Unitika Ltd.), 23 parts by weight of a polyphenylene oxide "PX-100L" (manufactured by Mitsubishi Engineering-Plastics Corporation), 1 part by weight of citric acid, 6 parts by weight of a hydrogenated styrene-ethylene-butadiene-styrene copolymer "KRATON G1651" (manufactured by Shell Chemical Co.), 20 parts by weight of fine talc powder having an average particle size of about 5 μm "Micro Ace P-3" (manufactured by Nippon Talc Co., Ltd.), and 4 parts by weight of a masterbatch of 15% by weight of the MWCNT "NANOCYL NC7000"/85% by weight of a product corresponding to the polyamide PA6 "A1030BRL" were pre-mixed, and the mixture was melt-kneaded through a twin screw extruder "TEX-4455" (manufactured by Japan Steel Works, LTD.) at 305° C., from which pellets were produced. Using the obtained pellets, a dumbbell test piece was produced through an injection molding machine "FN-1000" (manufactured by Nissei Plastic Industrial Co., Ltd.) in which the cylinder temperature was adjusted to 300° C. and the die temperature was adjusted to 100° C., and the coefficient of linear expansion measured was MD 5.4 and TD 6.0.

Comparative Example 13

Laminated Molded Article of Polyamide Resin Composition

The same procedures as in Example 27 were performed except that the pellets of the polyamide resin composition obtained in Production Example 4 were used. The evaluation results of the coating appearance, the presence or absence of scratches after the heat cycle test, the presence or absence of the contact and the strain after the immersion in the warm water bath are also shown in Table 9.

As shown in Table 9, in Comparative Example 13, the molded article was expanded due to moisture absorption after the warm water immersion test, and was brought into contact with the steel plate and pushed out with each other, resulting in the generation of strain; whereas, in Examples 27 to 52, the moisture absorption expansion was small, it was not brought into contact with the steel plate, and thus the strain of the shape was not generated.

Example 53

The aromatic polyester (component A), the aromatic polycarbonate (component B), the highly heat-resistant aromatic polycarbonate (component C), the graft-copolymer (component D), the ethylene copolymer (component E), the silicic acid filler (component F), the antioxidant (component J1), the releasing agent (component J2), the epoxy thermal stabilizer (component J3), the pigment (component J4), and the amorphous thermoplastic resin (component L) were pre-mixed in ratios shown in Table 10. The mixture was melt-kneaded through a twin screw extruder OMEGA40 (manufactured by STEER JAPAN Inc.) at 300° C. The obtained melted resin was continuously supplied to an impregnation die through which glass continuous fiber bundles (component K) pre-heated were passed, and the glass continuous fiber was impregnated with the resin. After that, the resin was continuously drawn out over from the impregnation die together with the glass fiber, which was cooled and then cut through a pelletizer into pellets having an average pellet length of 12 mm (a pultrusion method, PT in Table 10). At the time, the silicate filler (component F) were supplied from a side feeder.

Using the pellets obtained, a test piece and a flat plate were produced in the same manner as in Example 1, and they were subjected to the evaluations. The evaluation results are shown in Table 11.

Example 54

The aromatic polyester (component A), the aromatic polycarbonate (component B), the highly heat-resistant aromatic polycarbonate (component C), the graft-copolymer (component D), the ethylene copolymer (component E), the silicic acid filler (component F), the antioxidant (component J1), the releasing agent (component J2), the epoxy thermal stabilizer (component J3), the pigment (component J4), and the amorphous thermoplastic resin (component L) were pre-mixed in ratios shown in Table 10. The mixture was melt-kneaded at 300° C. through a twin screw extruder OMEGA40 (manufactured by STEER JAPAN Inc.), which FME elements was located on a place from a releasing bent part (quadruple eccentric stretch kneading elements) to the screws to a tip of the extruder, and was drawn out in a strand shape, cooled, and cut through a pelletizer, whereby pellets having an average pellet length of 12 mm were produced. At that time, the silicate filler (component F) was supplied from a side feeder. The glass continuous fiber (component L) was directly drawn in from the release bent part (a direct roving method. DR in Table 10).

Using the pellets obtained, a test piece and a flat plate were produced in the same manner as in Example 1, and they were subjected to the evaluations. The evaluation results are shown in Table 11.

Examples 55 to 58

The same procedures as in Example 53 were performed except that ratios of the aromatic polyester (component A), the aromatic polycarbonate (component B), the highly heat-resistant aromatic polycarbonate (component C), the graft-copolymer (component D), the ethylene copolymer (component E), the silicic acid filler (component F), the antioxidant (component J1), the releasing agent (component J2), the epoxy thermal stabilizer (component J3), the pigment (component J4), and the amorphous thermoplastic resin (component L) were changed to those shown in Table 10. The evaluation results are shown in Table 11.

From the results shown in Table 11, the resin compositions obtained in Examples 53 to 58 were excellent in the heat resistance, the surface impact strength, and the linear expansion. Further, the heat-resistant temperature of the resin compositions in Examples 57 and 58 was higher than 180° C., and not only they can stand the baking temperature of the coating layer of the coating material for an automobile outer panel but also they can be applied to an electrodeposition coating in which the coating layer is exposed to a higher temperature.

TABLE 10

| Material used | | | Example 53 | Example 54 | Example 55 | Example 56 | Example 57 | Example 58 |
|---|---|---|---|---|---|---|---|---|
| Component A: aromatic polyester | | A1-1 | 30.1 | 30.1 | 26.5 | 26.5 | 30.1 | 25.1 |
| Component B: aromatic polycarbonate | | B-2 | 5 | 5 | 4.3 | 4.3 | — | — |
| Component C: highly heat-resistant aromatic polycarbonate | | B-3 | 6.55 | 6.55 | 6 | 6 | — | — |
| Component D: graft-copolymer | | C-1 | 34.3 | 34.3 | 30.2 | 30.2 | 45.85 | 45.85 |
| Component E: ethylene copolymer | | D-5 | 1 | 1 | 1 | 1 | 1 | 1 |
| Component F: silicate filler | | E-1 | 3.5 | 3.5 | 3.5 | 3.5 | 3.5 | 3.5 |
| Component J: other components | | F-1 | 9 | 9 | 9 | 18 | 9 | 9 |
| | | J1-1 | 0.1 | 0.1 | 0.1 | 0.1 | 0.1 | 0.1 |
| | | J1-3 | 0.8 | 0.8 | 0.8 | 0.8 | 0.8 | 0.8 |
| | | J2-2 | 0.1 | 0.1 | 0.1 | 0.1 | 0.1 | 0.1 |
| | | J3-1 | 0.2 | 0.2 | 0.2 | 0.2 | 0.2 | 0.2 |
| | | J4-1 | 0.3 | 0.3 | 0.3 | 0.3 | 0.3 | 0.3 |
| Component K: Roving | K1: glass continuous | K1-1 | 9.0 | 9.0 | 18.0 | 9.0 | 9.0 | 9.0 |
| | Impregnation method | | PT | DR | PT | PT | PT | PT |
| Component L: amorphous thermoplastic resin | | L-1 | — | — | — | — | — | 5 |
| Total amount of component A1/ total amount of component A | | wt % | 100 | 100 | 100 | 100 | 100 | 100 |
| Total amount of component C/ total amount of component B and component C | | wt % | 75 | 75 | 75 | 75 | 100 | 100 |
| Total amount of component B and component C/ total amount of components A to C | | wt % | 60 | 60 | 60 | 60 | 60 | 65 |

TABLE 11

| Measurement item | Condition | Unit | Example 53 | Example 54 | Example 55 | Example 56 | Example 57 | Example 58 |
|---|---|---|---|---|---|---|---|---|
| MFR | 280° C., 21.18 N | g/10 min | 8.7 | 7.9 | 5.9 | 5.9 | 7.0 | 6.1 |
| SFL | 2 mmt, 300° C./M80° C. | mm | 285 | 280 | 220 | 220 | 245 | 230 |
| Deflection temperature under load (DTUL) | 1.80 MPa (A method) | C. | 153 | 152 | 152 | 151 | 157 | 162 |
| | 0.45 MPa (B method) | C. | 175 | 174 | 173 | 172 | 182 | 183 |
| Heat sag | 140° C. | mm | 1 | 1 | 1 | 1 | 1 | 1 |
| | 160° C. | mm | 3 | 3.5 | 3 | 3.5 | 2 | 1.5 |
| | 180° C. | mm | — | — | — | — | 5.5 | 4.5 |
| Surface appearance | — | — | ◎ | ◎ | ◎ | ○ | ◎ | ◎ |
| Coefficient of | −30 to 80° C., MD | e-5 | 3.1 | 3.2 | 2.2 | 2.8 | 3.2 | 3.1 |

TABLE 11-continued

| Measurement item | Condition | Unit | Example 53 | Example 54 | Example 55 | Example 56 | Example 57 | Example 58 |
|---|---|---|---|---|---|---|---|---|
| linear expansion | −30 to 80° C., TD | e-5 | 3.7 | 3.7 | 3.5 | 3.2 | 3.8 | 3.7 |
| Yield strength | 23° C. | MPa | 65 | 65 | 65 | 65 | 65 | 65 |
| Breaking strength | 23° C. | MPa | 51 | 51 | 51 | 51 | 51 | 51 |
| Breaking elongation | 23° C. | % | 12 | 12 | 12 | 12 | 12 | 12 |
| Bending strength | 23° C. | MPa | 143 | 129 | 124 | 130 | 145 | 143 |
| Flexural modulus | 23° C. | MPa | 5450 | 5400 | 6050 | 6850 | 5400 | 5400 |
| IZOD strength | 23° C. | J/m | 71 | 64 | 73 | 63 | 57 | 44 |
| IZOD strength | −30° C. | J/m | 44 | 40 | 46 | 39 | 37 | 37 |
| Surface impact strength | 23° C. | J | ≥22 | 17 | ≥22 | 15 | 12 | 10 |
| | −30° C. | J | 20 | 15 | 21 | 11 | 9.8 | 5.0 |
| Volume resistivity | 23° C. 3 mm-thickness | Ω cm | $10^{14}$ | $10^{14}$ | $10^{14}$ | $10^{14}$ | $10^{14}$ | $10^{14}$ |
| Specific gravity | — | | 1.39 | 1.39 | 1.48 | 1.47 | 1.37 | 1.36 |

From the above, the molded articles from Examples may be applied to the high temperature coating baking process, which is necessary for maintaining the consistency in the appearance with the coated parts of the metal members in the automobile outer panel or exterior, and can maintain the excellent appearance and the coating quality, because they have the small line expansion due to heat or deformation due to moisture absorption expansion, can inhibit the contact with the other members such as the steel plate, caused by the expansion, and hardly generate the deformation, scratch, and strain.

INDUSTRIAL APPLICABILITY

The resin composition according to one or more embodiments of the present invention may be used in the outer panel members for automobiles such as passenger cars, whose design and appearance are particularly importantly considered, and automobile outer panel member which is baking-finished.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

REFERENCE SIGNS LIST 10 molded article, which is supposed as an automobile outer panel
11 molded article-assembling part
12 center clip seat
13 edge part clip seat
20 steel plate
21 steel plate-assembling part
30 jig for evaluating coating
32 screw hole for assembling center clip seat of molded article
33 screw hole for assembling clip seat of edge part of molded article
35 screw hole for assembling steel plate
42 screw for assembling center clip seat of molded article
43 screw for assembling clip seat of edge part of molded article
45 screw for assembling steel plate

The invention claimed is:
1. A resin composition comprising:
   20 to 40 parts by weight of an aromatic polyester containing a polyethylene terephthalate wherein the aromatic polyester contains 70 to 100% by weight polyethylene terephthalate and 0 to 30% by weight polyoxyalkylene-modified polyalkylene terephthalate, and wherein the polyethylene terephthalate has a molecular weight of 0.6 or more as determined by a logarithmic viscosity of a solution thereof having a concentration of 0.5 g/dl in a mixed solvent of tetrachloroethane/phenol having a 50/50 weight ratio at 25° C.;
   5 to 30 parts by weight of a first polycarbonate containing 2,2-bis(4-hydroxyphenyl)propane as a monomer unit, the first polycarbonate being an aromatic polycarbonate having a deflection temperature under a load of 1.80 MPa, measured in accordance with ASTM D648, of between 110° C. and 140° C.;
   21 to 46.5 parts by weight of a second polycarbonate comprising 1,1-bis-(4-hydroxyphenyl)-3,3,5-trimethylcyclohexane and 2,2-bis(4-hydroxyphenyl)propane, the second polycarbonate being a highly heat-resistant aromatic polycarbonate having a deflection temperature under a load of 1.80 MPa, measured in accordance with ASTM D648, of 145° C. or higher;
   0 to 4.9 parts by weight of a graft-copolymer containing 40 to 90% by weight of a rubbery polymer having a glass transition temperature (Tg) of −10° C. or lower;
   0.1 to 4.9 parts by weight of an ethylene copolymer;
   6.5 to 24 parts by weight of a silicate filler;
   0 to 10 parts by weight of an electric conductive filler; and
   0 to 2 parts by weight of a phosphorus compound,
   wherein the total amount of the aromatic polyester, aromatic polycarbonate, highly heat-resistant aromatic polycarbonate, graft-copolymer, ethylene copolymer, silicate filler, electric conductive filler, and phosphorus compound is 100 parts by weight, wherein
   the ratio of the amount of the highly heat resistant aromatic polycarbonate to the total amount of the aromatic polycarbonate and highly heat resistant aromatic polycarbonate is 64.0% by weight or more,
   the ratio of the amount of the aromatic polycarbonate and the highly heat resistant polycarbonate to the total amount of the aromatic polyester, aromatic polycarbonate, and highly heat resistant aromatic polycarbonate is 55.5 to 74.5% by weight,
   the total amount of the graft-copolymer and the ethylene copolymer is from 3.1 to 6.9 parts by weight,
   the silicate filler is at least one compound selected from mica and kaolin, and
   the resin composition has a deflection temperature under a load of 1.80 MPa, measured in accordance with ASTM D648, of 149° C. or higher, wherein when the composition is processed into a type A1 dumbbell prescribed in ISO 20753, the type A1 dumbbell has a coefficient of linear thermal expansion in a flowing direction, measured in accordance with ISO 11359-2, of $5 \times 10^{-5}$ or less, and a flexural modulus measured in accordance with ISO 178 is 3000 MPa or more.

2. The resin composition according to claim 1, wherein the polyethylene terephthalate is produced using a germanium catalyst.

3. The resin composition according to claim 1, wherein the polyalkylene terephthalate is produced using a titanium-phosphorus catalyst.

4. The resin composition according to claim 1, wherein the polyalkylene terephthalate is produced using an antimony catalyst, and the phosphorus compound is used in an amount of 0.01 to 1 part by weight.

5. The resin composition according to claim 1, wherein the polyoxyalkylene-modified polyalkylene terephthalate is produced using at least one catalyst selected from the group consisting of a germanium catalyst, a titanium catalyst, and an aluminum catalyst.

6. The resin composition according to claim 1, wherein the highly heat-resistant aromatic polycarbonate is a polycarbonate formed of a bis(4-(2-hydroxyethoxy)phenyl)fluorene compound and a dihydroxybenzene compound and/or a dihydroxynaphthalene compound.

7. The resin composition according to claim 1, wherein the highly heat-resistant aromatic polycarbonate is a polycarbonate formed of a bis(4-hydroxyphenyl)fluorene compound and 2,2-bis(4-hydroxyphenyl)propane and/or α,α'-bis(4-hydroxyphenyl)-m-diisopropyl benzene.

8. The resin composition according to claim 1, wherein the highly heat-resistant aromatic polycarbonate is a polycarbonate formed of 2,2-bis(4-hydroxyphenyl)adamantane and 1,1-bis(4-hydroxyphenyl)cyclohexane.

9. The resin composition according to claim 1, wherein the silicate filler is used in an amount of 10.5 to 29 parts by weight.

10. The resin composition according to claim 1, wherein mica having a volume average particle size, measured in accordance with a laser diffraction method, of 0.5 to 45 μm, is used as the silicate filler.

11. The resin composition according to claim 1, further comprising an amorphous thermoplastic resin, different than the aromatic polycarbonate and the highly heat-resistant aromatic polycarbonate in an amount of 0.5 to 15 parts by weight.

12. The resin composition of claim 1, wherein the resin composition comprises from 0.1 to 4.9 parts by weight of the graft-copolymer.

13. A molded article obtained by molding the resin composition according to claim 1, which has a projected area of 40,000 mm² or more and an average thickness of 5 mm or less.

14. An exterior or an outer panel member for an automobile comprising the molded article according to claim 13.

15. A coated molded article comprising the molded article according to claim 13 and a coating layer, wherein the molded article is subjected to a coating-layer curing at a baking temperature of 60° C. to 170° C. after a coating material is coated.

16. A multi-layer composite comprising the molded article according to claim 13, and at least one cured resin selected from the group consisting of a cured polyester melamine resin, a cured alkyd melamine resin, a cured acrylic melamine resin, a cured acid epoxy resin, and a cured acrylic urethane resin.

\* \* \* \* \*